United States Patent [19]
Tozoni

[11] Patent Number: 5,652,472
[45] Date of Patent: Jul. 29, 1997

[54] MAGNETODYNAMIC LEVITATION AND STABILIZING SELFREGULATING SYSTEM

[76] Inventor: Oleg V. Tozoni, 11911 Parklawn Dr. Apt. 304, Rockville, Md. 30852

[21] Appl. No.: 575,065

[22] Filed: Dec. 19, 1995

[51] Int. Cl.[6] .............................. H02K 7/09; B60L 13/10
[52] U.S. Cl. .......................... 310/90.5; 310/12; 104/281; 104/282; 104/283
[58] Field of Search ................... 310/90.5, 12; 104/281, 104/282, 283, 286, 284, 285

[56] References Cited

U.S. PATENT DOCUMENTS

| | | | |
|---|---|---|---|
| 3,834,317 | 9/1974 | Miericke | 104/281 |
| 5,072,144 | 12/1991 | Saito et al. | 310/12 |
| 5,140,208 | 8/1992 | Tozoni | 310/90.5 |
| 5,218,257 | 6/1993 | Tozoni | 310/90.5 |
| 5,319,275 | 6/1994 | Tozoni | 310/90.5 |
| 5,388,527 | 2/1995 | Thornton | 104/284 |

Primary Examiner—Thomas M. Dougherty
Assistant Examiner—B. Mullins

[57] ABSTRACT

The proposed Magneto-Dynamic Levitation and Stabilizing Self-Regulating System (MDLSS) is designated for the stable flight of a heavy body along a given trajectory and can be employed for the magnetic levitation of vehicles and cars in high-speed ground transportation systems and for self-regulating magnetic bearings, various devices for ground acceleration, and also in the launching of space ships, missiles, and other technologies. The MDLSS system includes identical unique units connected rigidly with each other by non-magnetic ties and oriented relative to each other such that de-stabilizing forces created in one unit are compensated by stabilizing forces created in another unit once the equilibrium has been violated. Each of the units contains two extended steel cores (C-shaped in their cross-section), both lateral surfaces of which are covered by non-magnetic metallic screens, and a magnet assembly placed symmetrically in the air gap between the tips of the cores. The de-stabilizing forces are substantially decreased and the stabilizing forces are considerably increased, due to sharpening of the tips, using the saturated steel in the backs of the cores, and employing non-linear magnetic features of the saturated steel.

15 Claims, 13 Drawing Sheets

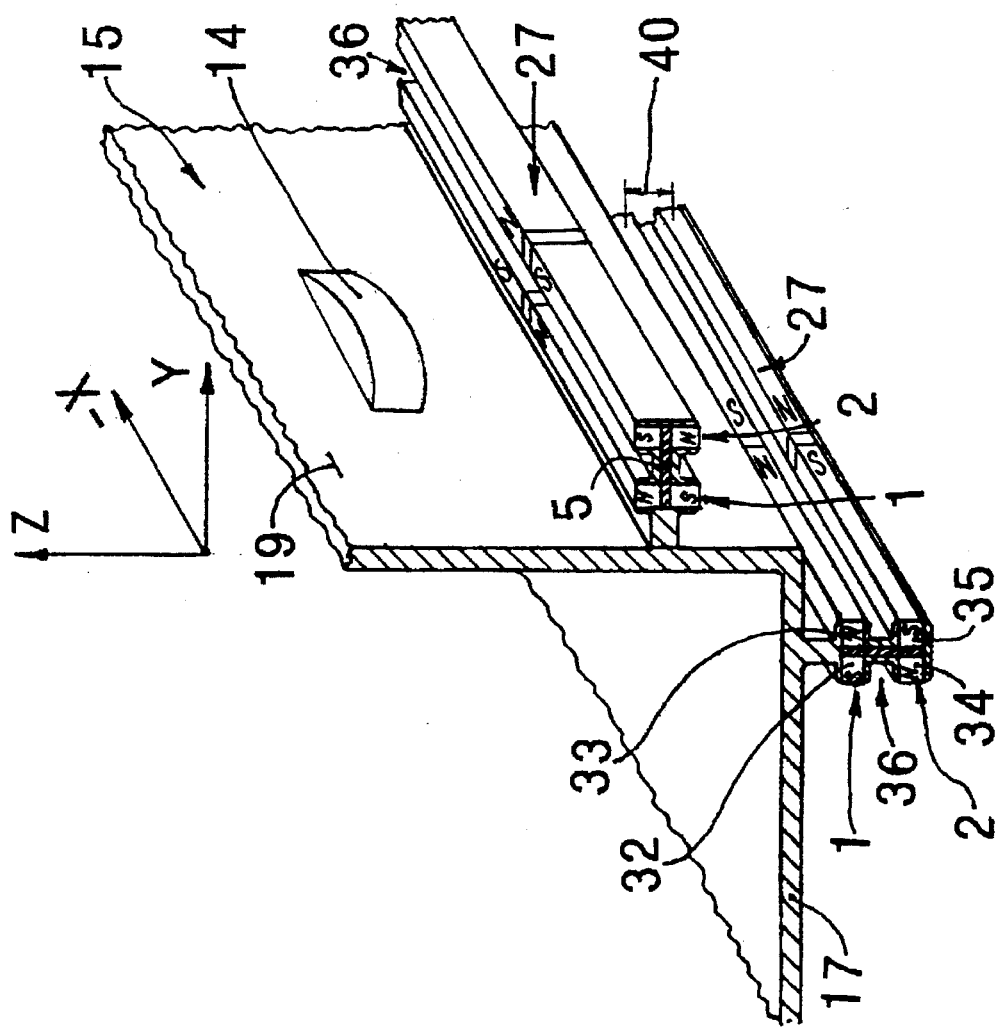

MAGNETODYNAMIC LEVITATION AND STABILIZING SELFREGULATING SYSTEM

FIELD OF THE INVENTION

The present invention relates to magnetic levitation of vehicles and cars in high-speed transportation systems, and, more particularly, to magnetic levitation self-regulating systems comprising permanent magnets and saturated steel cores covered with screens which maintain steel saturation at the level necessary to ensure the stable hovering of a moving vehicle (or car) in a magnetic field without any active control system and energy source.

BACKGROUND OF THE INVENTION

Two types of suspension capable of providing the magnetic forces required for vehicle suspension are known in the art. They include:

1. Electromagnetic Suspension (EMS) wherein electromagnets on the vehicle are attracted to a guide-way which has ferromagnetic rails (Transrapid, Germany); and
2. Electro-dynamic Suspension (EDS) wherein super-conductive magnets on the vehicle are repulsed from a guide-way which has nonmagnetic conductive rails (Japanese Maglev).

Both of these systems have serious drawbacks that delay their utilization for transportation needs.

EMS (Transrapid, Germany) fails to insure stable equilibrium of the vehicle without a fast-response automatic control system to control the size of the air gap between the electromagnet's poles and guide-way rails. Therefore, any failure in the control system or loss of current in the electromagnets may lead to a dangerous situation, and, possibly, to catastrophe. Moreover, the fast-response control system and also a large generator of current (with its own power supply) must be installed in the vehicle, so that the passenger/freight load comprises only a small fraction of the weight of the vehicle.

The EDS (Japanese Maglev) requires an on-board system for permanent cooling of super-conductive magnets. Failure to maintain the temperature strictly in pre-determined limits may lead to catastrophe. Moreover, although the super-conductive magnets produce a strong magnetic field, this field fails to provide sufficient forces for stable vehicle movement and, therefore, the EDS, similar to the EMS, also requires a fast-response control system and source of high power current to damp the vehicle vibration during turns. Besides, the strong magnetic field may be dangerous for passengers.

The other drawback of both systems is their low stiffness. It will be appreciated by those skilled in the art, that the coefficient of proportionality $f_s$ between the displacement and the increment of the internal stabilizing force is called "stiffness":

$$f_s = \partial F_s / \partial \delta$$

and represents the decisive parameter, i.e. the greater the stiffness, the smaller the displacement of the vehicle and, therefore, the better the quality of the magnetic suspension system.

Any suspension system functions by employing internal forces interacting between a magnetic field (produced by magnets located on the vehicle) and currents in guide-way rails (induced thereto by said magnetic field). As the distance from the magnets grows, the magnetic field subsides and the internal magnetic forces diminish, and their derivative—stiffness—diminishes at a more rapid (second-degree) rate.

The EMS system (Transrapid, Germany) never produces internal stabilizing forces. This system is internally unstable, and its stiffness is created and maintained artificially—by means of fast-response control system.

The poles of super-conductive magnets in the EDS system (Japanese Maglev) are covered with thick layers of thermo-insulation, and currents induced in the guide-way's rails are distributed over the layers' thickness. Accordingly, the distance between the magnets' poles and the induced currents in the rails is greater than the size of the air gap between the magnets' poles and the rails. Moreover, the value of the current induced in the non-magnetic conductive rail during the magnets' movement is many times smaller than in the magnetic steel rail. This tends to reduce the stabilizing internal magnetic force and the stiffness, which is much lower than is necessary for the stable movement.

According to Lagrangian theorem known to those skilled in the art (Pol Appell: Traite de Mecanique Rationnelle. Paris, Gauthier-Villars, Etc. Editeurs), if at a certain position of a conservative system, its potential energy has a strict local minimum, then that position is a stable equilibrium point of the system, in order to provide stable vehicle flight along an assigned trajectory, it is necessary and sufficient that the potential energy of such a system had a strict local minimum at all points of the trajectory.

Disadvantageously, the magnets of the existing systems do not have an equilibrium position therein, and the magnetic field is distributed in such a way as to create destabilizing forces only, tending to attract the magnets to the respective iron cores.

In order to provide stability to the existing systems, a fast-response automatic control system is necessary. Such control is expensive and unfortunately, is not reliable at present.

It would be highly desirable to provide a vehicle suspension free of the drawbacks of the existing systems (Transrapid, Germany and Japanese Maglev).

Different magnetic levitation self-regulating systems disclosed in U.S. Pat. Nos. 5,140,208; 5,218,257; and 5,319,275 (invented by the same inventor as the present invention), were proposed having enhanced stabilization forces designated for stable hovering of heavy bodies.

For example, U.S. Pat. No. 5,140,208 discloses a Self-Adjusting Magnetic Guidance System for Levitated Vehicle Guide-Way, which employs new magnetic devices comprising two C-shaped steel cores affixed on the guide-way and a group of permanent magnets (further referred to as PMs) affixed to the bottom of the vehicle. The magnetic flux threads the PMs and steel cores. Affixed to the guide-way, the steel cores stretch magnetic flux tubes exisiting in the air gap at the right and left sides of the PMs. At the shift of the PMs downwards by the weight of the vehicle, the magnetic flux tubes tend to shrink, and as a result, pull the PMs upwards to their equilibrium position by and engendered stabilizing force which is proportionate to the shift value. At any failure, the vehicle is maintained suspended within the magnetic field.

Disadvantageously, a lateral shift of the magnets engenders a substantial destabilizing force.

U.S. Pat. No. 5,218,257 discloses a Magnetic Levitation Self-Regulating System, consisting of magnetic devices identical to those described in the above patent. These magnetic devices are connected in such manner that the destabilizing force in each of them is compensated by the stabilizing force of an adjacent unit. Disadvantageously, the destabilizing forces in the system prevail the stabilizing forces, therefore, the full compensation is not achieved.

U.S. Pat. No. 5,319,275 discloses a Magnetic Levitation Self-Regulating System having enhanced stabilizing forces and solves the above problems by means of strip screens covering end faces of the cores and extended along the entire stator. However, in order to be effective, the screens should have considerable thickness (not less than 20% of the distance between the PMs in the unit), doubling the air gap between the PM and respective core, and thus substantially reducing the stabilizing force and the stiffness. This radically lowers the quality and increases the cost of the system.

It would be highly desirable to provide a magnetic levitation serf-regulating system overcoming the disadvantages of the above described systems.

SUMMARY OF THE INVENTION

It is, therefore, an object of the present invention to provide a Magneto-Dynamic Levitation and Stabilizing Self-Regulating System (further referred to as MDLSS) insuring the rigid and stable vehicle flight and hovering in the magneto-dynamic suspension.

It is another object of the present invention to provide a MDLSS ensuring strict local minimum of potential energy along the whole trajectory of the levitator movement.

It is still an object of the present invention to provide a MDLSS assigning a flexible trajectory corridor to a vehicle by exploiting the movement of PMs, non-linear specific reluctance of the steel, special shape of steel cores and special screens covering substantially the length of both sides of the cores' backs in order to create forces maintaining the stable flight of the vehicle along a guide-way.

It is yet an object of the present invention to provide a MDLSS, wherein the levitator's PMs and the stator's steel cores create such a distribution of the magnetic field in the air gap of the system where any deviation of the levitator from the given trajectory engenders the stabilizing forces tending to return the levitator on its trajectory.

The present invention may find particular utility for magnetic levitation of vehicles and cars in high speed ground transportation systems. Moreover, it can be applied to self-regulating magnetic bearings, various devices for ground acceleration and also to launching space ships, missiles and many other technologies.

The MDLSS system of the present invention was created as a system comprising identical units. Each unit reacts on external impacts causing displacements from the equilibrium position by creating two kinds of internal magnetic forces: a stabilizing force tending to bring the magnetic device back to the equilibrium position, and a destabilizing force tending to bring it out the equilibrium. The present invention proved that:

it is possible to make the value of the stabilizing force equal or greater than the value of the destabilizing force by sharpening its core tips;

the destabilizing force can be considerably lowered by using saturated steel in the core backs;

the conducting screen affixed on the lateral surface of the saturated steel core can almost totally suppress dissipation fluxes and, thus, maintain the needed level of saturation along the whole length of the core back.

According to the principles of the present invention, a MDLSS comprises four identical units installed on a common foundation determining the trajectory of movement and on the body (vehicle). Each unit comprises a stator assembly and a levitator assembly magnetically coupled to the stator assembly and movable with respect thereto. The stator assembly includes a pair of substantially identical elongated laminated steel cores, each including a back and a pair of substantially identical tips, the back having external and internal lateral surfaces. Preferably, the steel core has a C-shaped cross-section. Each of the tips is wider than the back and has a sharpened end thereon.

In each pair thereof, the cores are positioned symmetrically with their tips towards the tips of the opposite core. The stator assembly further includes non-magnetic conductive screens covering the external and internal lateral surfaces of the back of each core.

The levitator assembly includes four permanent magnets (elongated and rectangular in their cross-section) connected by rigid ties and positioned in two levels with similar magnetization vectors of two permanent magnets in each level. The respective permanent magnets in these two levels positioned one under another have the magnetization vectors of opposite polarity.

It is of essence that a distance between the sharpened ends of the tips of each core is substantially equal to a distance between middle points of the rectangular cross-sections of the permanent magnets positioned in each of said two levels. The permanent magnets of the levitator assembly are disposed in the air gap existing between the tips of the cores of the stator assembly.

The levitator assembly has an equilibrium position in which the permanent magnets in each of said two levels are situated centrally in the air gap between respective tips of the opposite cores and with the middle points of the permanent magnets in precise registration with the sharpened end of respective tips of the cores of the stator assembly.

The permanent magnets of the levitator assembly generate an original magnetic field and magnetize the steel cores of the stator assembly which in turn create a secondary magnetic filed, and, once the levitator assembly has been displaced from the equilibrium position, the original and the secondary magnetic fields create a stabilizing force returning the levitator assembly to the equilibrium position.

Preferably, the MDLSS comprises a common foundation having a bottom and a pair of spaced apart side walls (perpendicular to the bottom) for assigning a trajectory for a heavy body (vehicle) for moving therealong.

A first pair of substantially identical said units are installed symmetrically between the bottoms of the body and the common foundation, and the unit of a second pair of substantially identical said units is installed between respective side walls of the body and the common foundation in precise registration therebetween. It is clear that the stator assemblies of the units are installed on the common foundation, and the levitator assemblies of said units are installed on the body.

The stator assembly extends substantially the length of the pre-determined trajectory, with a distance between the respective tips of the opposite steel cores invariable along the length of the trajectory.

The levitator assembly extends substantially the length of the body and includes a plurality of substantially identical levitator sub-assemblies, each comprising said four permanent magnets connected by rigid ties and positioned in two levels with two permanent magnets of opposite polarity in each level, such that the adjacent permanent magnets in each two adjacent levitator subassemblies are of opposite polarity and have a certain period of alteration of the permanent magnets' polarity along the length of the body. During the motion of the body along the pre-determined trajectory, the permanent magnets of the levitator assembly produce magnetic fluxes in the steel cores of the stator assembly. These magnetic fluxes alternate periodically with a frequency proportionate to the speed of the body and inversely proportionate to the period of alteration of the permanent magnets' polarity along the length of the body.

The permanent magnets in each of the two levels of the levitator assembly are magnetized parallel to a straight line connecting the sharpened ends of the respective said tips of the opposite cores. An orientation of magnetization in one of said two levels is opposite to an orientation of magnetization in another one of said two levels. Displacement of the permanent magnets in the direction parallel to the orientation of magnetization in any of said two levels towards one of the steel cores, engenders an internal destabilizing force which tends to further attract the magnet assembly to said one of the two steel cores, while displacement of the permanent magnets in the direction perpendicular to the direction of magnetization and the pre-determined trajectory, engender an internal stabilizing force tending to reduce the displacement and to bring the magnets back to the equilibrium position. Any turn of the levitator assembly around an axis parallel to the direction of magnetization engenders an internal stabilizing torque which tends to return the magnet assembly to the equilibrium position. The directions of these stabilizing and destabilizing forces are reciprocally perpendicular.

The shape of all the details, both the stator and levitator, are cylindrical with the generetrix parallel to the trajectory of the levitator movement (Axis OX). The main peculiarity of the MDLSS is its ability to insure stable flight of the levitator along the assigned trajectory without any active control system and any energy source. This means that any small deviation of the moving levitator from its trajectory engenders magnetic forces in the system which suppress this deviation.

If the magnets in the gap are immovable and disposed symmetrically then they are in unstable equilibrium. This means that any small shift $\Delta y$ of the magnets in the direction parallel to the magnetization vector creates a destabilizing force $F_d$ tending to attract the magnets to the nearest core. As the shift grows, the destabilizing force grows too. Meanwhile, the immovable magnets are in stable equilibrium in the direction perpendicular to both the magnetization vector and the trajectory. That means any small shift $\Delta z$ of the magnets creates the stabilizing force $F_s$ tending to reduce the shift and bring the magnets back to the original position. As the shift grows, the stabilizing force grows too. The directions of the stabilizing and the destabilizing force in the unit are reciprocally perpendicular.

The unique measures are undertaken in the present invention to reach the stable flight and hovering of the body along the trajectory, that is to suppress the de-stabilizing forces and to increase the stabilizing forces in the MDLSS. These measures include employing non-linear features of the steel of the cores, saturation of the back of each core, covering the lateral surfaces of the back of each core with conductive screens for suppressing the dissipation fluxes, and sharpening the ends of the tips of each core.

These and other objects of the present invention will become apparent from a reading of the following specification taken in conjunction with the enclosed drawings.

BRIEF DESCRIPTION OF THE DRAWINGS

FIG. 1C is a perspective view of the right-side section of the vehicle-levitator.

DETAILED DESCRIPTION

Figure 1A:
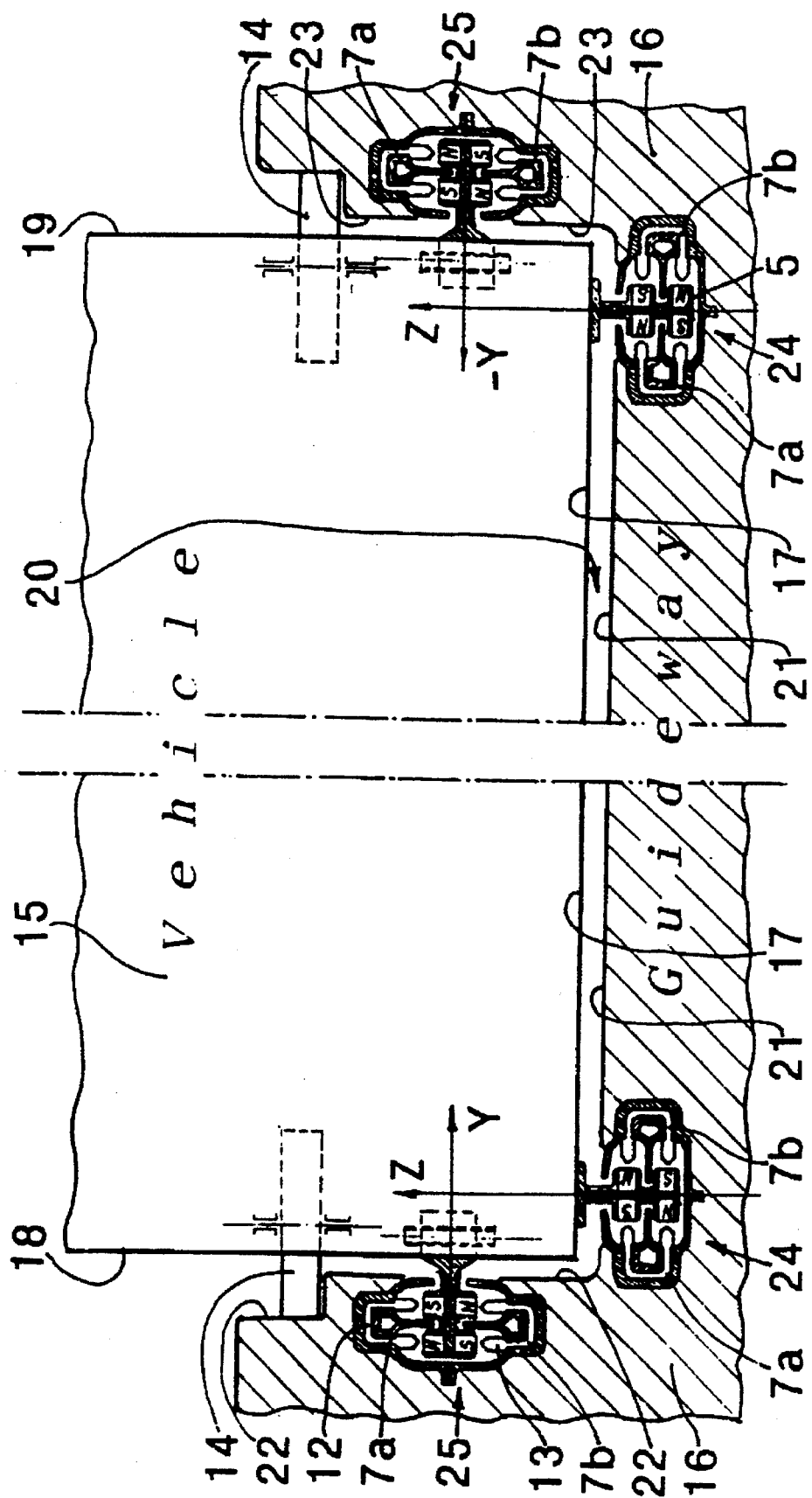
FIG. 1A is a cross-sectional, front view of the moving Magneto-Dynamic Levitation and Stabilizing Self-Regulating System constructed in accordance with the principles of present invention.
Figure 1B:
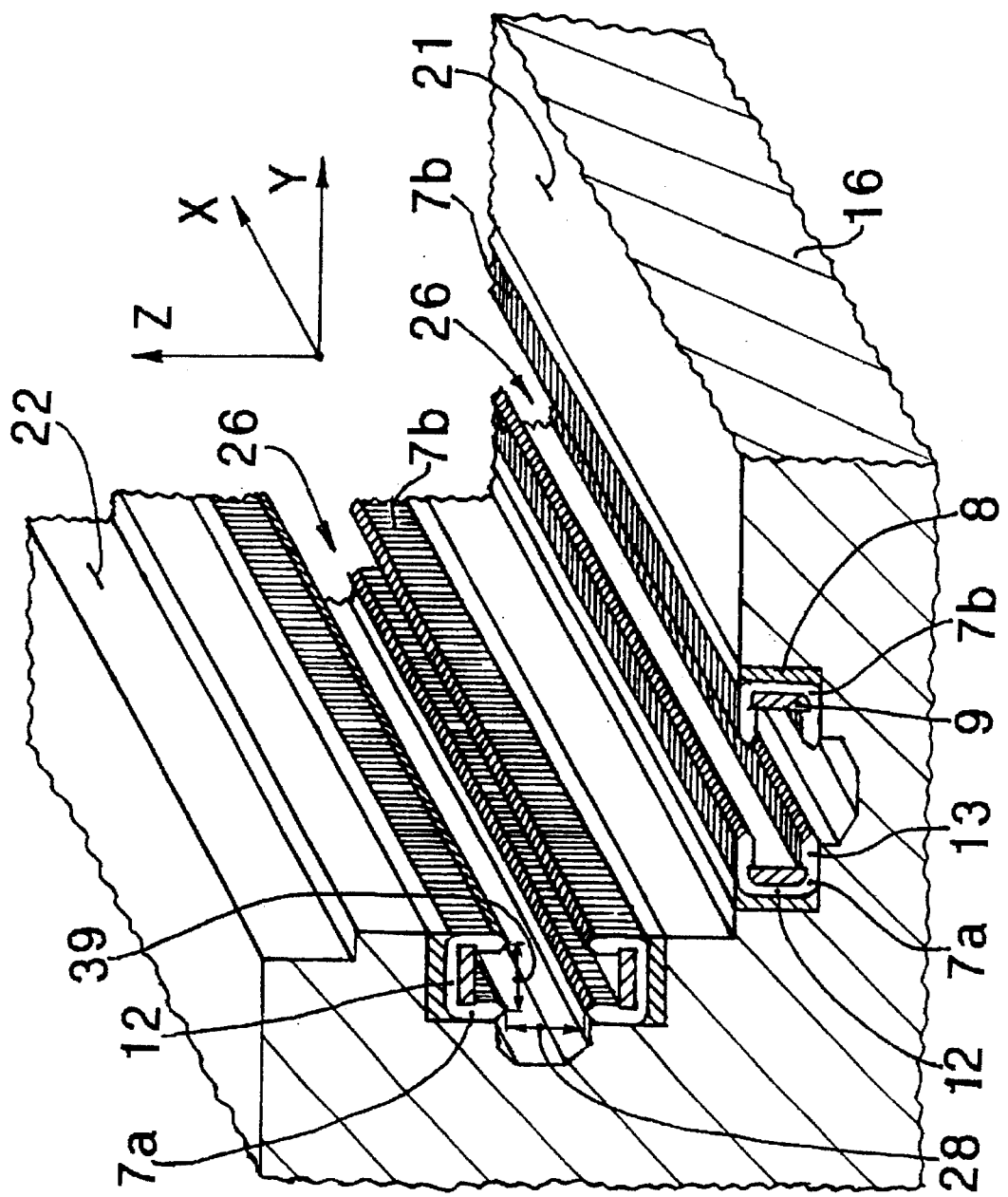
FIG. 1B is a perspective view of the left-side section of the guideway-stator in which, for purposes of illustration, the protruding arms of the conducting screens have been cut away.

Referring to FIGS. 1A, 1B and 1C, a heavy body (or vehicle) 15 moves along a guide-way which comprises a common foundation 16 made of a suitable non-conducting and non-magnetic material, for example, concrete. The vehicle 15 has a bottom 17 and two spaced apart side walls 18 and 19, substantially perpendicular to the bottom 17. The common foundation 16 has an elongated cavity 20 which determines a trajectory of the vehicle's 15 movement. The cavity 20 in the common foundation 16 has a bottom 21 and a pair of side walls 22,23. The vehicle 15, as best shown in FIG. 1A, moves within the cavity 20, such that the bottom 17 of the vehicle 15 levitates above an is parallel to the bottom 21 of the cavity 20, while the walls 18,19 positioned between the walls 22,23. It is necessary to provide for stable flight and hovering for the vehicle 15 along the trajectory pre-determined by the cavity 20 in the common foundation 16.

It will be appreciated by those skilled in the art, that, as best shown in FIGS. 1A–1C, the axis OX is parallel to the trajectory of the vehicle's 15 movement, the axis OY is substantially perpendicular to the trajectory, and the axis OZ is perpendicular to the bottom 21 of the common foundation 16.

As best shown in FIGS. 1A–1C, the stable movement of the vehicle 15 is provided by units 24 symmetrically installed between the bottom 17 of the vehicle 15 and the bottom 21 of the common foundation 16, and by units 25 symmetrically installed between side walls 18, 22 and 19,23 of the vehicle 15 and the common foundation 15, respectively. The units 25, as well as the units 24, are installed in precise registration with each other, i.e. in precise symmetry relative to the longitudinal axes of the common foundation 16 and the vehicle 15.

As best shown in FIGS. 1A, 1B, 1C and 2A, each unit 24 or 25 (the units 24 and 25 are substantially identical units) comprises a stator assembly 26 and a levitator assembly 27 magnetically coupled to each other.

The stator assemblies 26 of the units 24 and 25 are installed on the bottom 21 and the and side walls 22 and 23 of the common foundation 16, and thereby constitute a stator—guide-way assembly which is a stationary (immovable) structure. The stator assemblies 26 are connected by rigid ties, and extend the whole length of the trajectory of the vehicle's movement determined by the common foundation 16.

The levitator assemblies 27 of the units 24 and 25 are installed on the bottom 17 and the side walls 18,19 of the vehicle 15, and extend the whole length of the vehicle 15. The levitator assemblies 27 are bonded by rigid ties across the vehicle 15, are immovable relative to the vehicle 15, and movable (as one whole with the vehicle 15) relative to the stator assemblies 26.

Figure 2A:
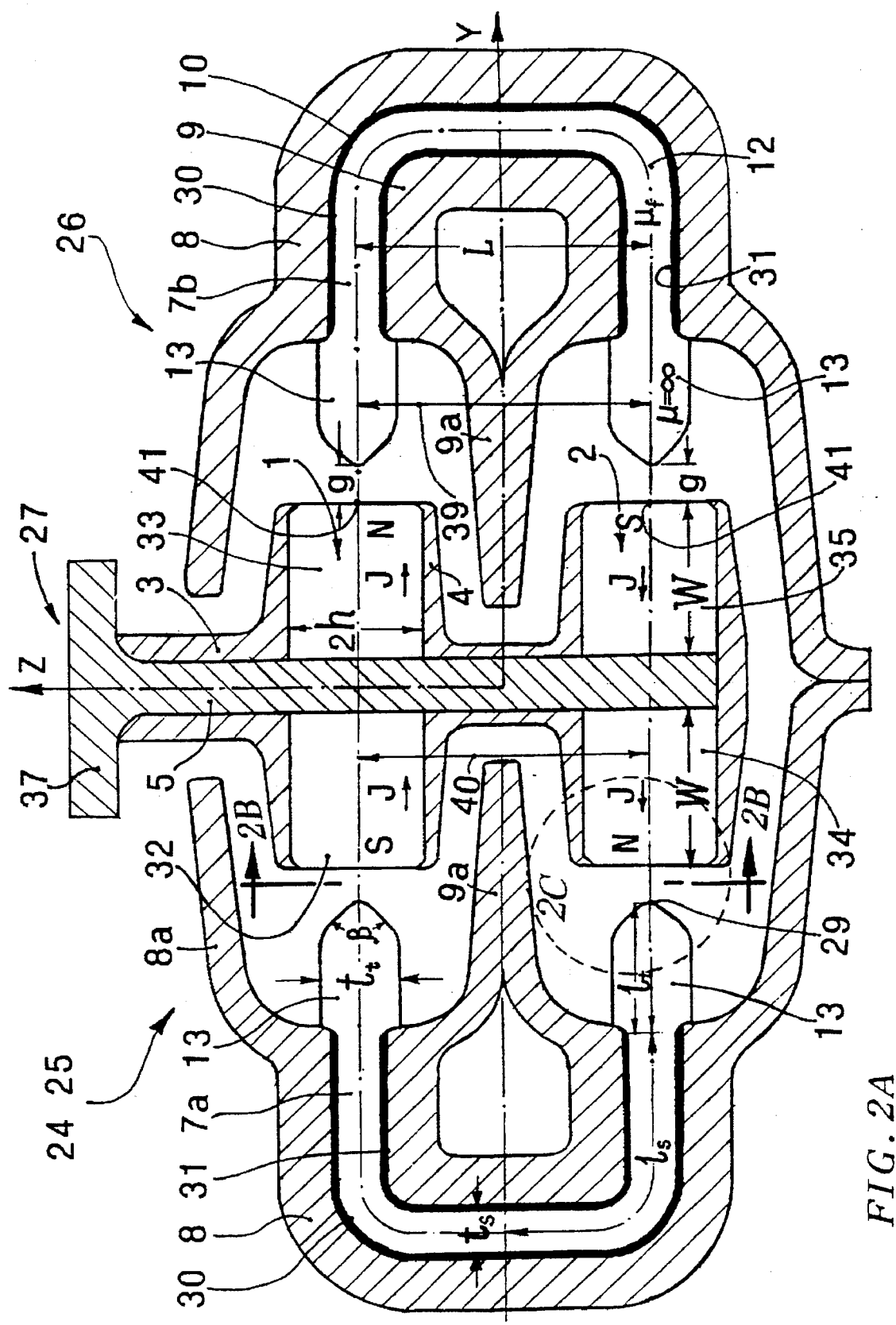
FIG. 2A is a cross-sectional, front view of a single unit as a component of the MDLSS system, constructed in accordance with principles of present invention.

The stator assembly 26 of each unit 24 or 25 includes a pair of substantially identical elongated laminated steel cores $7a$ and $7b$, preferably having C-shaped cross-section. As best shown in FIGS. 1A, 1B and 2A, each core $7a$, $7b$ has a back 12 (extending a length $21_s$ and having a width $t_s$) and a a pair of identical tips 13. The tips of the core $7a$ extend the length $l_t$ from the back 12 of the core $7a$ towards the symmetrical tips 13 of the opposite core $7b$. The width $t_t$ of the tips 13 is bigger than the width $t_s$ of the core $7a,7b$. The back 12 is saturated, while the tips 13 of the core $7a,7b$ are not saturated. The cores are connected in such a manner that the gap 28 between the respective tips 13 of the opposite cores $7a$ and $7b$ is invariable along the entire trajectory of the vehicle's 15 movement. As best shown in FIG. 2A and 2C, the tips 13 have the sharpened end 29.

The back 12 has an external lateral surface 30 and an internal lateral surface 31. Both surfaces 30 and 31 are covered with non-magnetic conductive, for instance, aluminum and brass screens 8,9,10 and 11.

The levitator assembly 27 of the unit 24 or 25 includes four permanent magnets 32, 33, 34 and 35, which are connected by rigid non-magnetic ties and positioned in two levels 1 and 2. As best shown in FIG. 2A, the magnets 32 and 33 located in the level 1 are of the same polarity, similar to the magnets 34 and 35 located in the level 2, which are also of the same polarity, directed however opposite to the polarity of the magnets 32 and 33 in the level 1. It means that the magnets located one under another in the levels 1 and 2, i.e. magnets 32–34 and 33–35 are of the opposite polarities. All four permanent magnets 32–35 are the rear-earth permanent magnets "Crumax" (with dimentions 2h×W) and substantially rectangular in their cross-section.

An iron insertion strip 5 is inserted symmetrically between two magnets in each level 1 or 2, and protrudes through both levels 1 and 2, thereby rigidly connecting the permanent magnets 32–35 in a magnet assembly 36. The insertion strip 5 has an extension 37, by means of which the insertion strip 5 connects the whole magnet assembly 36 of the levitator assembly to the bottom 17 of the vehicle 15. The permanent magnets are connected by the rigid strip 5 and fixed by non-magnetic corner plates 3, channel bars 4, and plates 6 in such a manner that in the cross-section in the plane X=const, the magnetization vectors J in the different layers 1 and 2 are directed contrarily in each cross-section.

Figure 2B:
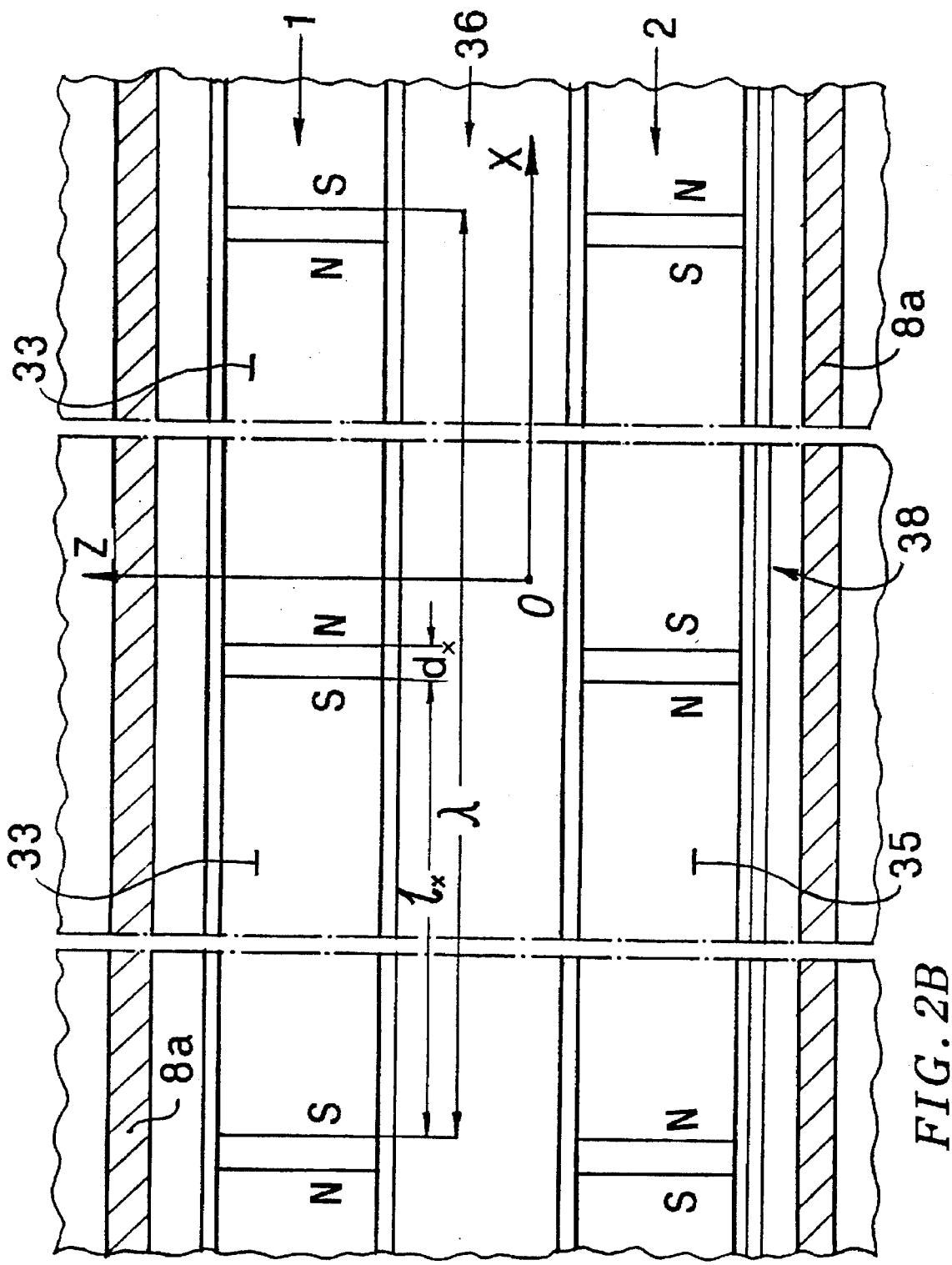
FIG. 2B is a side view of the portion of the magnets are assembled in two layer, taken along the lines 2B—2B of FIG. 2A.
Figure 2C:
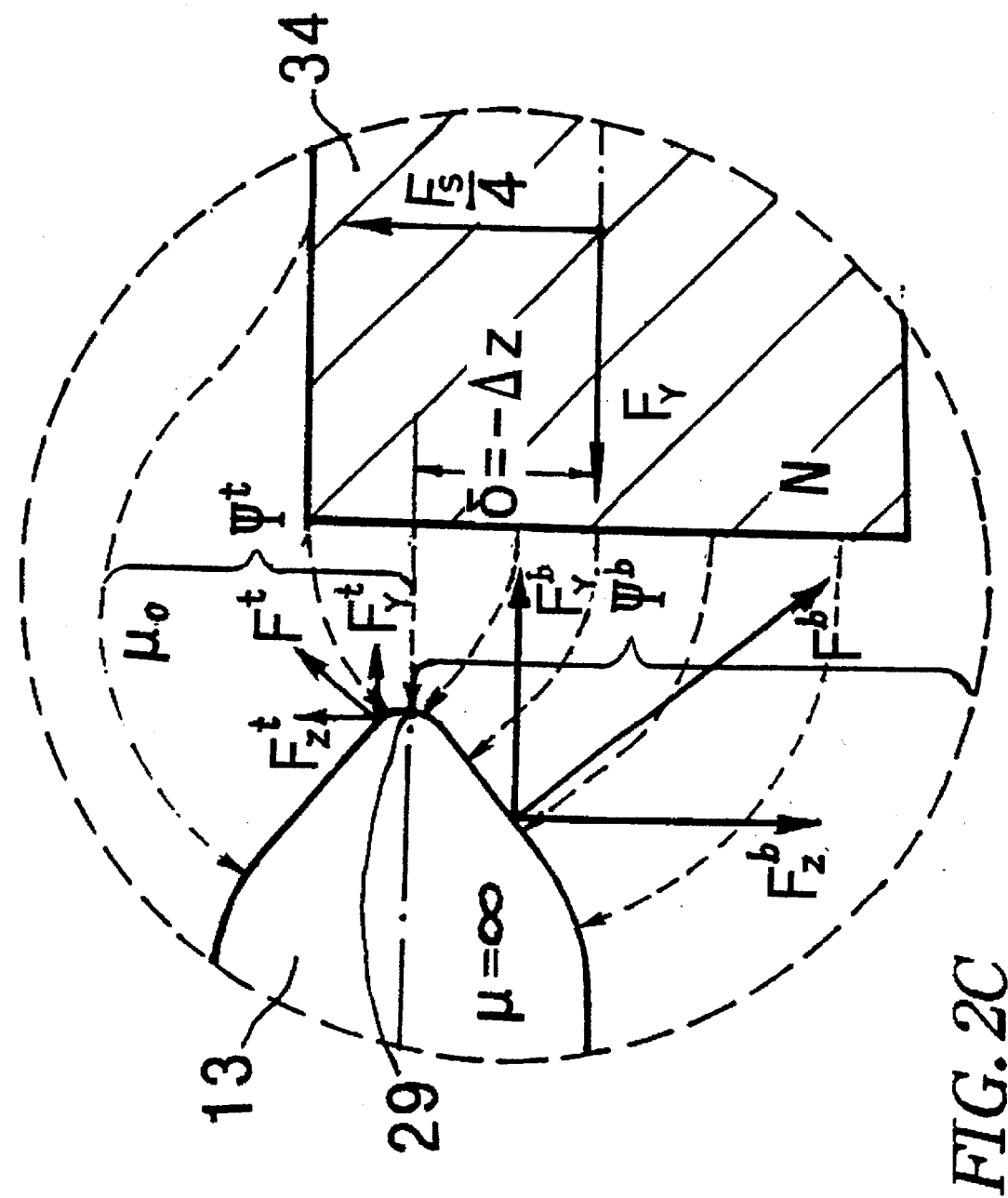
FIG. 2C is a partial cross-sectional view (drawn to an enlarged skale) of the air-gap segment between the sharp end of the core tip and the magnet pole, explaining the formation of a stabilizing force when the magnets are shifted downward.

As best shown in FIGS. 1C and 2B, along the length of the vehicle 15, the polarities of the permanent magnets periodically alternate with the period $\lambda$. It, therefore, for sake of simplicity, may be considered, that along the length of the vehicle 15, a plurality of substantially identical levitator sub-assemblies 38 are positioned (each identical to the levitator assembly 27), such that in each two adjacent levitator sub-assemblies 38 the adjacent magnets are of opposite polarity.

Once the above-described stator assemblies 26 have been installed onto the common foundation 16, and the above-described levitator assemblies 27 have been affixed to the vehicle 15 (with the polarity of the permanent magnets in each level 1 and 2 periodically alternating along the length of the vehicle 15), and the vehicle 15 has been placed into the cavity 20 in the common foundation 16, the permanent magnets 32–35 of the levitator assembly 27 are becoming positioned in the air gap 28 between the tips 13 of the stator assembly 26. It is of essence that the distance 39 between the sharpened ends 29 of the tips 13 is equal to the distance 40 between the middle points 41 of the rectangular sections of the magnets (32–34 or 33–35) positioned one under another in different levels 1 and 2. Besides, in the air gap 28, the magnets 32–35 are positioned centrally, such that the gaps g between each magnet 32–35 and the sharpened end 29 of the respective tip 13 are equal.

The permanent magnets 32–35 produce an original magnetic field and magnetize the steel cores $7a$ and $7b$, which, in turn, create a secondary magnetic field. Any deviation of the levitator assembly from the equilibrium position relative to the stator assembly changes distribution and interaction of the magnet fluxes of the original and the secondary magnet fields, and therefore, creates and changes different forces resulting from the interaction between the original and the secondary fields in the unit 24 or 25.

Figure 3B:
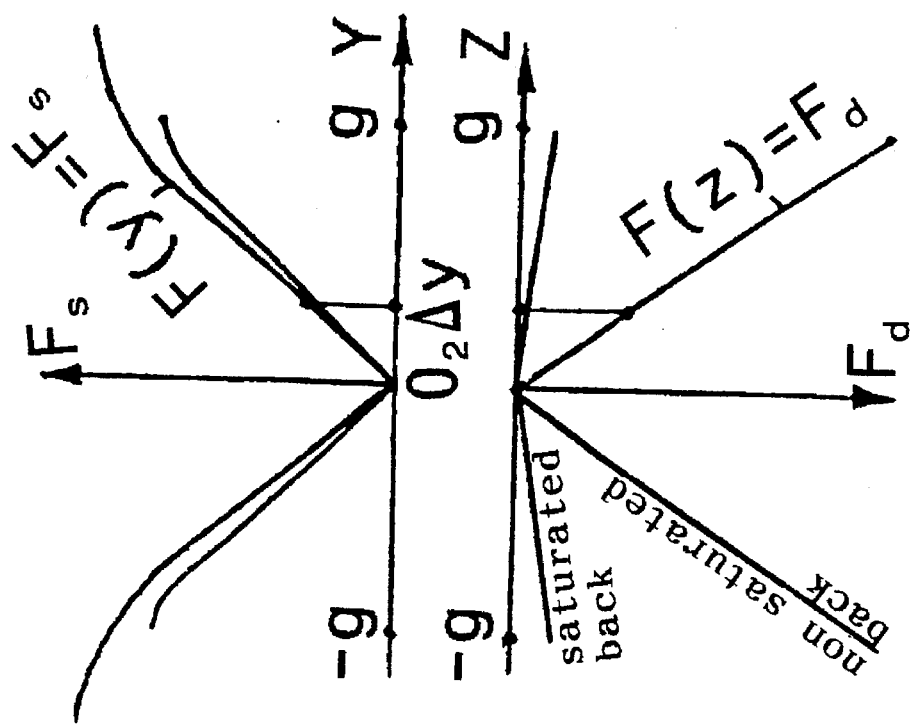
FIG. 3B shows graphical profiles of the stabilizing and destabilizing forces' distribution as functions of the displacement or magnets along the gap and across the gap in the unit, which is turned at right angles to the unit of FIG. 3A.
Figure 3A:
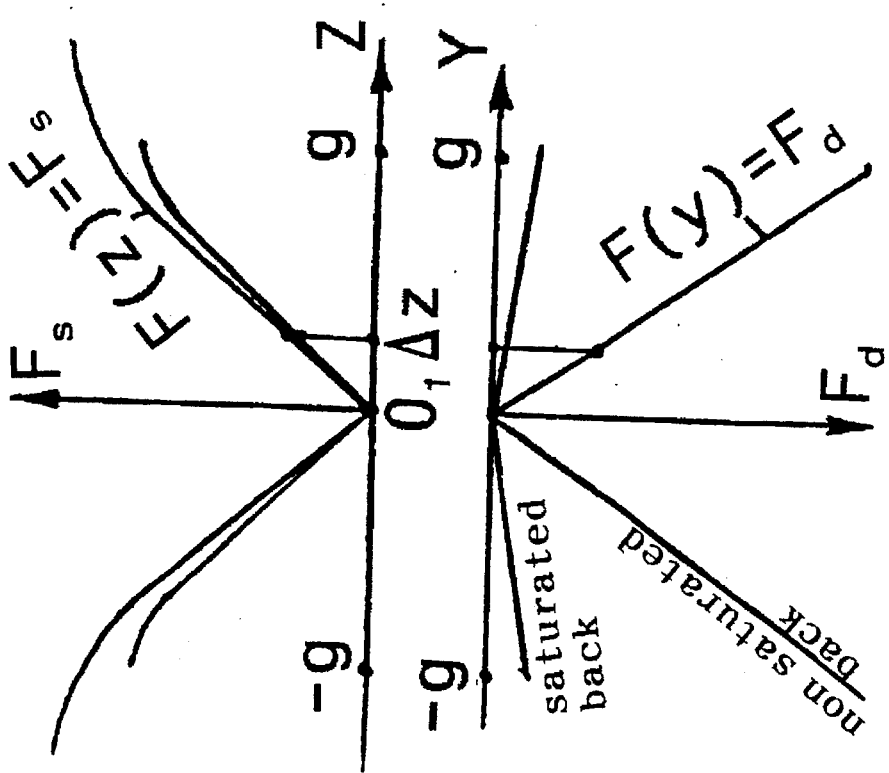
FIG. 3A shows graphical profiles of the stabilizing and destabilizing forces' distribution in the unit of the present invention as functions of the displacement of magnets along the gap and across the gap respectively.

Referring again to FIG. 2A, if the magnet assembly 36 in the air gap 28 is immovable and is disposed symmetrically, then the levitator assembly 27 is in unstable equilibrium with respect to the axis OY. It means that, as best shown in FIG. 3A (the lower diagram), any small deviation $\delta = \Delta y$ of the magnet assembly 36 along the axis OY towards the respective nearest core $7a$ or $7b$, creates a destabilizing force $F_d$ tending to increase the deviation and to attract the magnets to this nearest core. As the deviation $\Delta y$ grows, the force $F_d$ grows until the magnets touch the tips 13 of this nearest core $7a$ or $7b$. Meanwhile, the immovable magnet assembly 36 is in stable equilibrium with respect to the axis OZ. That means that any small deviation $\delta = \Delta z$ of the magnets along the axis OZ creates the stabilizing force $F_s$, best shown in FIG. 3A (the upper diagram), tending to reduce the deviation and bring the magnets back to the original position. As the deviation $\Delta z$ grows, the stabilizing force also increase until it reaches some magnitude $F_{smax}$ and then declines. The directions of the forces $F_s$ and $F_d$ in the unit are reciprocally perpendicular. It means that, for the units 24 disposed between the bottoms 17 and 21 of the vehicle 15 and the common foundation 16, the force $F_s$ will provide a stable lifting of the vehicle 15 above the bottom 21 of the common foundation 16 (thereby maintaining the vehicle at a certain required level), while, for the units 25 disposed between the side walls 18–22 and 19–23, respectively, the force $F_s$ will provide a certain distance between these side walls 18–22 and 19–23, thereby stabilizing the movement of the vehicle from both sides.

Besides, the destabilizing forces $F_d$ (parallel to the axis OY) created in the units 24 and tending to attract the magnets to the tips 13 of the nearest core, are compensated by the stabilizing forces $F_s$ (parallel to the axis OY) created in the units 25. Similarly, the destabilizing forces $F_d$ in the units 25 (parallel to the axis OZ) are compensated by the stabilizing forces $F_s$ in the units 24 (parallel to the axis OZ). As best shown in FIGS. 3A an 3B, the stabilizing forces Fs and destabilizing forces Fd in each unit 24 or 25 are perpendicular to each other. But, since the units 24 are positioned perpendicular to the units 25, the stabilizing force $F_s$ in the units 24 is parallel to the destabilizing force $F_d$ in the units 25 (and vice-versa) and is applied to the respective units in the direction opposite to the destabilizing force, thereby tending to compensate the destabilizing force created by a deviation from the equilibrium.

It is clear that to provide the stable hovering of the vehicle 15 within the common foundation 16, the stabilizing forces in the system must prevail the destabilizing forces.

In order to increase the stabilizing forces and to decrease the destabilizing forces, the following unique measures have been undertaken in the present invention:

the destabilizing forces have been considerably lowered by using saturated steel in the backs 12 of the cores 7a and 7b;

the value of the stabilizing force has been made greater or at least equal to the respective destabilizing force by means of sharpening the ends 29 of the tips 13;

the destabilizing forces have been considerably reduced by using non-linear properties of the steel cores, almost totally suppressing dissipation fluxes by means of covering the lateral surfaces of the cores' backs 12 by conducting screen, thereby maintaining the needed level of saturation along the whole length of the backs 12.

The following discussion will facilitate the better understanding of the processes in the units 24 or 25, and the system as a whole.

The unique characteristics of the units 24 and 25 permit the MDLSS to be designed as an assembly of units connecting separately all the core couples (stator) and all the magnet couples (levitator) by rigid ties. The permanent magnet assembly 36 in each pair of units 24–25 are tied in such a way that the direction of their magnetization vectors J are reciprocally perpendicular and the generetrix of all the cylindrical parts are parallel to each other, as best shown in FIG. 1A. Then, the destabilizing force $F_d$ of one unit, for instance, 24, is compensated by the stabilizing force $F_s$ of another, for example, 25.

The rigid ties connecting the magnets 32–35 of all the units into the overall levitator part of the MDLSS perform the following functions:

1. superpose all the equilibrium points $0_i$ of the magnets 32–35 into one common equilibrium point 0 of the overall levitator part of the MDLSS;
2. make the shifts $\Delta y$ and $\Delta z$ of the magnets interdependent: $\Delta y_i = \Delta z_{i+1}$, $\Delta z_i = \Delta y_{i+1}$;
3. create the proportional relation between the shifts $\Delta y$, $\Delta z$ of the magnets and turnings $\alpha_x$, $\alpha_y$, $\alpha_z$ of the overall levitator part around the coordinate Axes OX, OY, OZ;
4. summarize all the external forces and torques, applied to the overall levitator part.

It will be appreciated by those skilled in the art that the vehicle 15 carrying the overall levitator part of the MDLSS and providing rigid ties between the permanent magnets 32–35 can be considered as the overall levitator part of the MDLSS.

The following conditions of stability apply to the MDLSS.

The vehicle 15 (like any solid body in free space) possesses six degrees of freedom: three deviations $\Delta_x$, $\Delta_y$, $\Delta_z$ along the Cartesian Axes and three rotation angles $\alpha_x$, $\alpha_y$, $\alpha_z$ around these Axes. To attain the stable suspension of the vehicle 15 traveling along its trajectory, the MDLSS should automatically suppress five out of the six degrees of freedom. This condition of stability is achieved in the MDLSS in question by providing such a distribution of the secondary sources of the magnetic field in the system (that is, molecular magnetization currents in the cores 7a,7b and eddy currents in the screens 8–11) that any deviation $\delta$ of the vehicle 15 from its trajectory engenders the forces tending to return it to its original position.

The forces and force torques acting on the vehicle are the partial derivatives of the potential energy E of the system. Applying the Lagrangian Theorem of stability to the MDLSS, we conclude that the position of the vehicle 15 traveling along its trajectory is stable if it corresponds to a local minimum of the potential energy E of the system.

In the MDLSS with the vehicle 15 moving with the speed $V > V_0$, the local minimum of potential energy E is provided along the whole trajectory. To prove that directly it is sufficient to determine E in terms of the explicit function of two shifts and three turnings in the vicinity $\delta$ of the assigned trajectory (Axis OX) and then to show that values of E are minimal along the trajectory.

The potential energy of MDLSS is an abstract conception. There are no devices for directly measuring its values. We can measure just only external forces F, applied to the vehicle 15 at its displacements from the equilibrium. According to Newton's Third Law these forces are equal and opposite to the internal (magnetic) forces of the system. All the following considerations deal with external forces, utilizing this connection.

According to Lagrangian Theorem, in the vicinity of stable equilibrium of the vehicle at any its shift the potential energy may increase only as the result of work of the external forces. At the points of the equilibrium (that is, along the assigned trajectory) the main vector F and the main torque M of the internal forces, acting on the vehicle 15, should equal zero; while in the vicinity $\delta \leq \Delta y = \Delta z$ of the equilibrium (i.e., in the vicinity of the assigned trajectory) they should be negative. Thus, any little deviation $\delta_I$ of the vehicle 15 from the trajectory or turning $\alpha_i$ creates a counteracting force or torque. In this case, the equilibrium of the vehicle 15 is stable.

Since the trajectory of the vehicle 15 movement coincides with the Axis OX, the shifts and turnings are equal to the coordinates of its center of gravity: $\Delta y = y$, $\Delta z = z$, $\Delta \alpha_i = \alpha_i$. Hence, the conditions of stability of the vehicle 15 movements expressed through internal forces should be written as follows:

$$F_y = -\partial E/\partial y = (-y)\partial F_y/\partial y; \ F_z = -\partial E/\partial z = (-z)\partial F_z/\partial z; \ M_x = -\partial E/\partial \alpha_x = (-\alpha_x)\partial M_x/\partial \alpha_x; \ M_y = -\partial E/\partial \alpha_y = (-\alpha_y)\partial M_y/\partial \alpha_y; \ M_z = -\partial E/\partial \alpha_z = (-\alpha_z)\partial M_z/\partial \alpha_z.$$ (1)

It is clear that, in the presence of minimal potential energy, the magnetic forces and torques at the points of the trajectory should be zero, and in the vicinity δ of the trajectory they should grow in proportion to shifts or turnings taken with the opposite sign.

One of the functions performed by the rigid ties, which is discussed above (i.e., the proportional relation between shifts y, z and turnings $\alpha_x$, $\alpha_y$, $\alpha_z$ of the vehicle 15 of MDLSS), essentially simplify the proof, transforming the complicated functions of five variables (the potential energy $E(y, z, \alpha_x, \alpha_y, \alpha_z)$ and force $F(y, z, \alpha_x, \alpha_y, \alpha_z)$) into depictible functions of two variable coordinates y, z of regular space E(y,z) and F(y,z).

Let us now consider a subsystem, best shown in FIGS. 1A, 1B and 1C, comprising two units 24 and 25 superposed in such a way that the magnetizing vectors J of their magnets are reciprocally perpendicular to each other. The rigid ties connect the equilibrium points $0_1$ and $0_1$ of the magnets belonging to the units 24 and 25 into one common equilibrium point $0_j$ of the levitator of the subsystem.

Figure 3D:
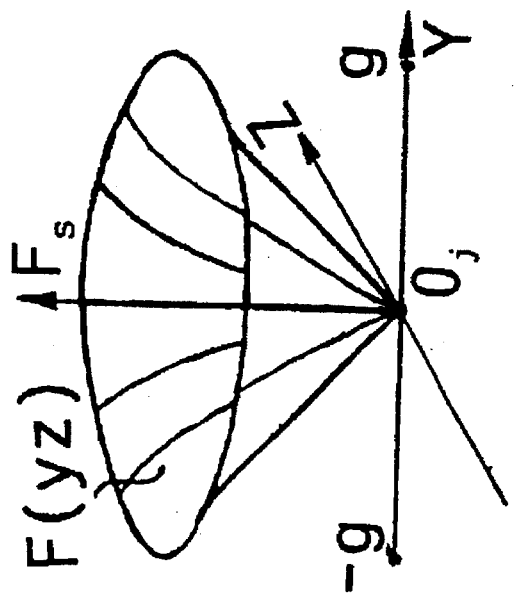
FIG. 3D is a graph of the resulting force surface corresponding to the local minimum of the potential energy in the point of stable equilibrium.
Figure 3E:
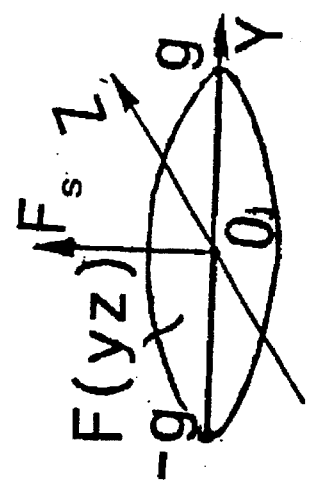
FIG. 3E is a graph of the resulting force surface taking a shape of plain disk at the indifferent equilibrium.
Figure 3C:
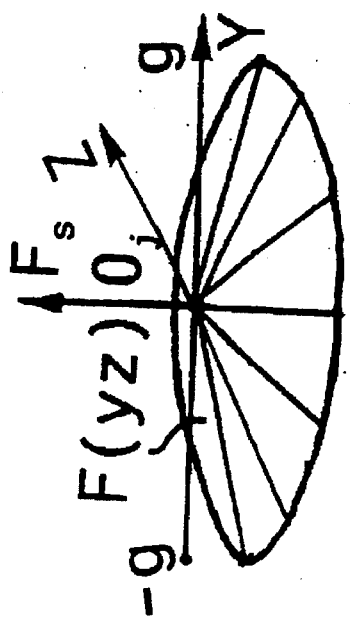
FIG. 3C is a graph of the resulting force surface corresponding to the local maximum of the potential energy in the point of unstable equilibrium.

As best shown in FIGS. 3C-3E, an abstract mathematical space is determined by the coordinate system (y,z,F), where y and z are the deviations of the levitator in the plain perpendicular to its trajectory (i.e., the Axis OX), and F is an external force that has to be applied to the levitator shifted into point (y,z) to compensate for the internal magnetic forces ($F_s$ and $F_d$). Let us consider that in this "space" the external force F is positive if it is directed out of the equilibrium $0_j$ and negative if it is directed toward it (whatever is its direction in regular space). In the coordinate system (y,z,F), the tip of the vector of the external force F(y,z) (the function of the levitators shifts) forms a surface, shown in FIG. 3C, that we will call the "force surface" F(y,z) _of the subsystem of two units 24 and 25 with perpendicular vectors of magnetization J. After the units 24 and 25 are connected, the stabilizing forces of both units $F_{s1}$ and $F_{s2}$ (as well as de-stabilizing forces $F_{d1}$ and $F_{d2}$) become reciprocally perpendicular and are summarized like vectors, as follows:

$$F_{su} = \sqrt{(F_{s1}^2 + F_{s2}^2)}, \ F_{du} = \sqrt{(F_{d1}^2 + F_{d2}^2)}$$

where $F_{su}$ and $F_{du}$ are resulting stabilizing and destabilizing forces respectively. In such a construction, the deviations of the magnet become interdependent: $z_1 = y_2$ and $z_2 = y_1$ and the resulting deviation δ of the levitator of the subsystem is determined by the formula:

$$\delta = \sqrt{(\Delta z_1^2 + \Delta y_1^2)} = \sqrt{(\Delta y_2^2 + \Delta z_2^2)} = \sqrt{(z^2 + y^2)}$$

In the vicinity of the equilibrium of a separate unit 24 or 25 (before connecting in the subsystem) the forces $F_s$ and $F_d$ were proportional to the values of the deviations along the coordinates $\Delta z = z$ and $\Delta y = y$, i.e., $F_{s1} = z\partial F_{s1}/\partial z$, $F_{d1} = y\partial F_{d1}/\partial y$, $F_{s2} = y\partial F_{s2}/\partial y$, $F_{d2} = z\partial F_{d2}/\partial z$, where $\partial F_{si}/\partial \delta$ and $\partial F_{di}/\partial \delta$ are the stiffness of the forces. In the subsystem, after the units 24 and 25 have been connected together, the forces $F_{su}$ and $F_{du}$ are proportional to the value of the resulting deviation δ:

$$F_{su} = \sqrt{(F_{s1}^2 + F_{s2}^2)} = \sqrt{(z^2 + y^2)} \partial F_s/\partial \delta = \delta \partial F_s/\partial \delta$$

$$F_{du} = \sqrt{(F_{d1}^2 + F_{d2}^2)} = \delta \partial F_d/\partial \delta$$

Hence, one can see that in the vicinity or $0_j$ (the subsystem's equilibrium) the resulting force surfaces $F_{su}(y,z)$ and $F_{du}(y,z)$ are the lateral surfaces of the coaxial circular cones with a common vertex at point $0_j$. As shown in FIGS. 3A and 3B, the upper cone formed by the stabilizing forces, is turned upside-down. Its vertex is in the equilibrium $0_j$, its base is parallel to the plane F=0, and its height $h_s = F_{smax}$ and is proportional to the stiffness $\partial F_s/\partial z$. The bottom cone is formed by the destabilizing forces and is situated below the plane F=0. Its base is a circle of radius g, and its height $h_d = F_d(g)$, proportional to the stiffness $\partial F_d/\partial y$.

In summarizing the ordinates of the two obtained cones, the rigid tie creates a new resulting force surface. In as much as $F_d$ and $F_s$ are opposite in direction, the resulting force surface may take three different shapes, shown in FIGS. 3C, 3D, and 3E, depending on the ratio of the stiffnesses $\partial F_s/\partial \delta$ and $\partial F_d/\partial \delta$ such as:

1. Given that $\partial F_s/\partial \delta < \partial F_d/\partial \delta$, the resulting surface is a cone corresponding to the local maximum of the potential energy in the point $0_j$ of unstable equilibrium, as shown in FIG. 3C;
2. Given that $\partial F_s/\partial \delta > \partial F_d/\partial \delta$, the resulting surface is an overturned cone corresponding to the local minimum of the potential energy in the same point $0_j$ to become the stable equilibrium, as shown in FIG. 3D;
3. Given that $\partial F_s/\partial \delta = \partial F_d/\partial \delta$, the resulting surface takes a shape of plane disk of radius g with the center in the point $0_j$ of the indifferent equilibrium, as shown in FIG. 3E.

The energetic surface of the subsystem obtaining by integration of the force surface represents a paraboloid with the extreme in the point $0_j$ of the levitator's equilibrium. Under the condition $\partial F_s/\partial \delta > \partial F_d/\partial \delta$ this extreme becomes its minimum.

Figure 4:
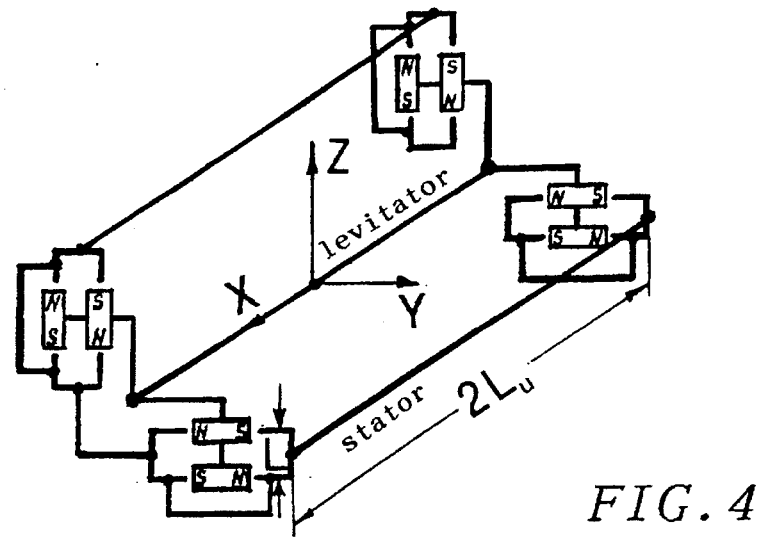
FIG. 4 is a schematic drawing of two rigidly connected subsystems.

Now we will prove the following lemma:

In order to construct the MDLSS which would insure the stable movement of the vehicle 15 along the trajectory assigned by the stator assemblies 26 in the cavity 20 of the common foundation 16, in other words, the system, having the local minimum of the potential energy in the space of two shifts and three turnings, it is necessary and sufficient to assemble it of four rigidly connected subsystems, best shown in FIG. 4, each of which would have a local minimum of potential energy in the point $0_j$ of the space of two shifts.

The presence of the minimum of the energy means that the point $0_j$ is an equilibrium of the levitator belonging to a j-subsystem and any deviation (Δy and Δz) on the plane X=0 causes counteracting forces $F_y = \Delta y \partial F_y/\partial y$ or $F_z = \Delta z \partial F_z/\partial z$ tending to return the levitator to the equilibrium. Therefore, connecting any two of the subsystems with a rigid tie of length $2L_u$ ($L_u >> L$) paralleled to the coordinate Axis OX we insure the stability of the composed subsystem towards its turnings α around two perpendicular Axes OY and OZ. Actually, each turning $\alpha_y$ of the composed subsystem leads to the deviations $\pm \Delta z = \alpha_y L_u$ (FIG. 4) of its levitators and creates a pair of forces $\pm F_z$ counteracting the turning. Similarly, the turning $\alpha_z$ creates a counteracting pair of forces $\pm F_y$. Taking two pairs of subsystems and connecting them with rigid ties of length $2L_u$ and parallel to the Axes OX and OY we obtain the MDLSS having the local minimum of potential energy along the assigned trajectory, and, therefore, stable with regard to all external impacts, as shown in FIG. 1A.

In such a MDLSS the force surfaces of all four subsystems are the lateral surfaces of overturned cones. Assembly into an MDLSS makes them coaxial and summarizes them in one common surface $F_\Sigma(y, z, \alpha_x, \alpha_y, \alpha_z) = F_{\Sigma 1}(y,z)$, since $\alpha_x = z/L_u$, $\alpha_y = y/L_u$, $\alpha_z = z/L_u$ and the turnings are proportional to the shifts. The energetic surface of the MDLSS takes a shape of paraboloid with the minimum point situated along the trajectory assigned by the stator.

The proven lemma reduces the problem of determining conditions for stable movement of the MDLSS levitator to those providing a minimum of potential energy of each of the subsystems comprising two units (resolved above).

Based on the above discussion, the following statement is formulated:

In order to stabilize movement of the MDLSS vehicle 15, it is necessary and sufficient that the following condition be fulfilled in each unit: the stiffness $\partial F_s/\partial z$ of the stabilizing force has to exceed the stiffness $\partial F_d/\partial y$ of the destabilizing force in the vicinity of the equilibrium. This means that the following inequality should be satisfied:

$$\partial F_s/\partial z > \partial F_d/\partial y \qquad (2)$$

The greater the different between the right-hand and left-hand parts of this inequality, the more MDLSS stability can be reached.

Figure 5:
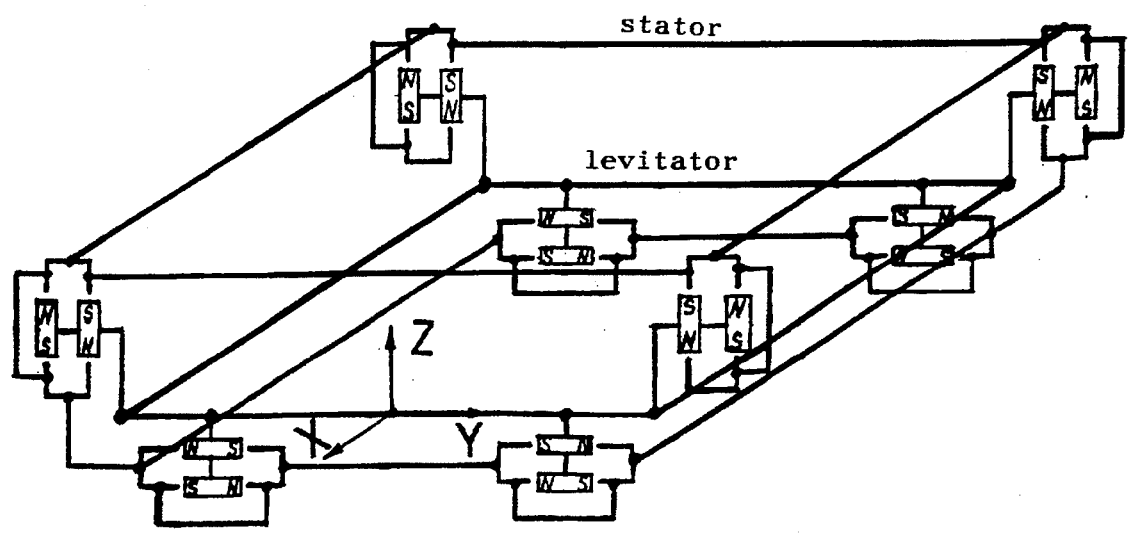
FIG. 5 is a schematic drawing of the rigidly connected eight units (or four subsystems of FIG. 4) placed into vertices of a square.

To verify this statement it is sufficient to compose the expressions for the components $F_y$, $F_z$, $M_x$, $M_y$, $M_z$ of the main vector and torque of the magnetic forces acting on the levitator of the system comprising eight units placed into the vertexes of a square with a side $2L_u$, as shown in FIG. 5. If the inequality (2) is fulfilled then with the relations: $F_{s1}=F_{s2}=F_{s3}=F_{s4}$, $F_{d1}=F_{d2}=F_{d3}=F_{d4}$ and $\Delta_y=\Delta_z$ (which follow from the conditions that all the units are identical and all the ties between them are rigid) the Lagrangian Theorem requirements (1) are satisfied.

Real units 24 and 25 have elongated cores 7a,7b extended along the whole trajectory and permanent magnets 32-35 extended along the whole vehicle 15. Therefore, a real subsystem comprising both bottom (supporting) units 24 and side (stabilizing) units 25, is equivalent to considered above composed subsystem with two subsystems drawn apart along Axis OX, which shown in FIGS. 4 and 5. Accordingly, in order to reach the necessary stability of the whole MDLSS, it is sufficient to connect rigidly two real subsystems drawn apart along Axis OY by the distance $L_u \gg L$. The rigid tie is expedient to be fixed after the magnets of the supporting units 24 have settled down affected by the weight of the loaded vehicle before its start. In this case, the stabilizing magnets in the units 25 will not be deviated towards the bottom core in the unit 25 and, thus, will not create the destabilizing force which, otherwise, should be compensated by the supporting magnets in the units 24.

In order to construct a unit with the above properties let us consider the mechanism for creating the stabilizing and destabilizing forces $F_s$ and $F_d$ that affect its magnets.

As disclosed above, the tips 13 of the cores 7a,7b have the sharpened ends 29. The following discussion explains the mechanism for increasing the stabilizing forces and decreasing the de-stabilizing forces by sharpening the ends 29 of the tips 13.

Any force $f=f_n n^0+f_t t^0$ acting per unit of even surface S of the steel core 7a,7b in the magnetic field is determined by the formula:

$$f=n^0(1-1/\mu_r^2)B_n^2/(2\mu_0)+t^0(1-1/\mu_r)B_nH_t \qquad (3)$$

where $n^0$ and $t^0$ are respectively the unitary vectors of the normal and the tangent to the surface S; $B_n$ and $H_t$ are respectively the normal magnetic flux density and tangential magnetic intensity on S from the outside.

If the steel is unsaturated, then $\mu_r \to \infty$ and $H_t \approx 0$. In this case $f_t = 0$ and $$f(Q)=n^0 B_n^2/(2\mu_0) \qquad (4)$$

If the steel is saturated then $\infty > \mu_r > 1$ and $f_t$ may be commensurable with $f_n$.

It follows from (4), that the magnetic force acting on the lateral surface S of the unsaturated unit cores is expressed by the formula:

$$F=jF_d-kF_s=jF_y+kF_z=0.5/\mu_0[j\int B_n^2(Q) \cos(j,n_Q^0)dS_Q+k\int B_n^2(Q) \cos(k,n_Q^0)dS_Q] \qquad (5)$$

According to Newton's Third Law a force of the same value but of opposite direction acts on the permanent magnets of the unit.

Figure 6:
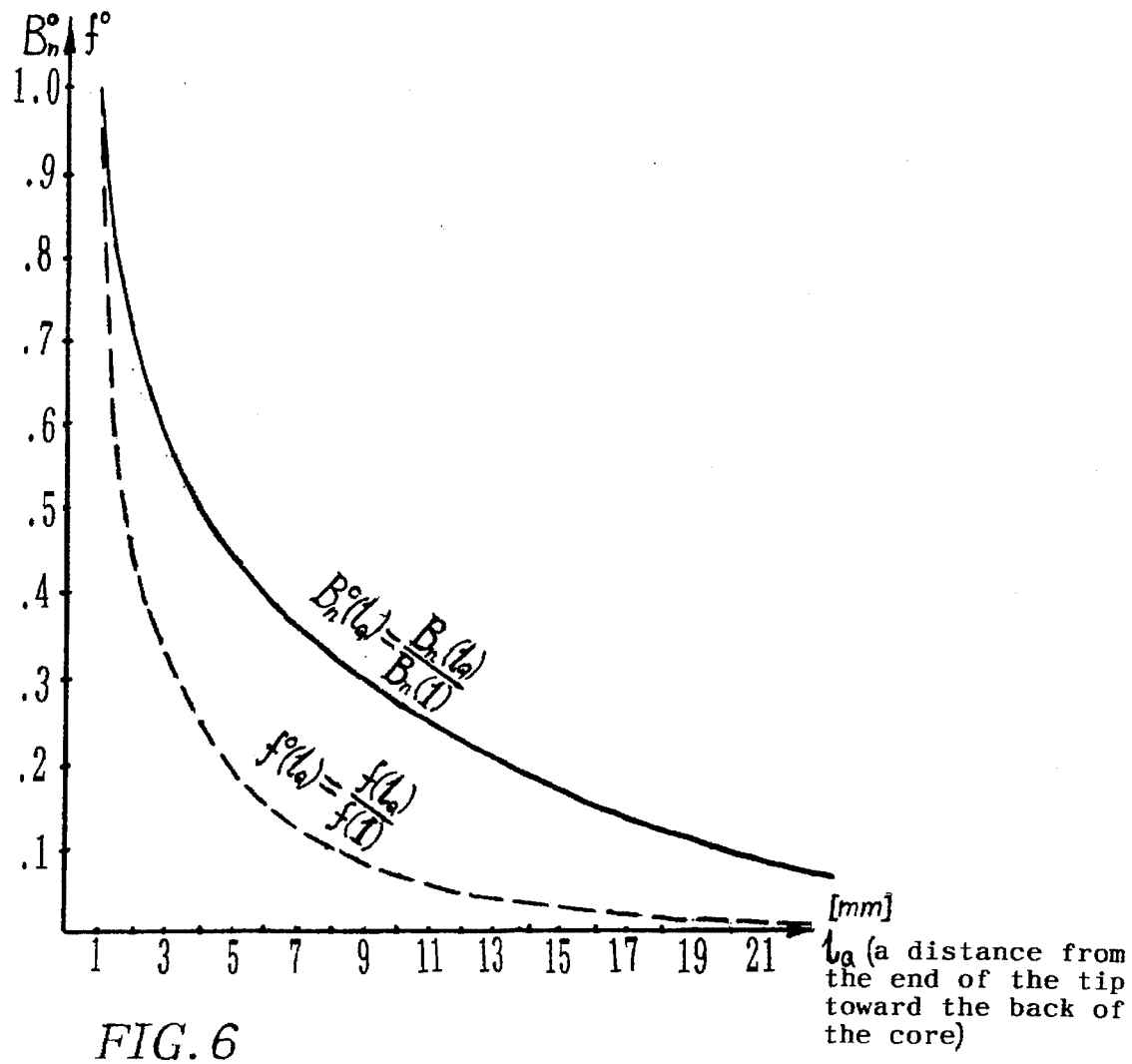
FIG. 6 shows graphs of the distribution of the magnetic flux density and specific magnetic force along cross-section profile of a core tip.

The magnetic field in the unit gap is plane-parallel. The distribution of the magnetic flux density $B_n(Q)$ over the surface of the tip 13, obtained by applying conformal mapping and best shown in FIG. 6, is such that as point Q moves away from the magnet pole, the magnetic flux density $B_n$ diminishes rapidly; the specific force f (which is proportional to the square of the density) diminishes even more rapidly. Hence, we may neglect the flux penetrating into the back 12 of the core 7a, 7b and consider only force F, created by the flux penetrating into the thickened unsaturated tips.

Taking into account the symmetrical shape of the tips (with respect to the planes Y=0 and Z=const) and transforming the integral in expression (5), which applies the generalized mean value theorem, we obtain the following expressions for components of the force:

$$F_d=C_d\int[B_n(Q_R)-B_n(Q_L)]dS_Q=C_d(\Psi_{WR}-\Psi_{WL}), \qquad (6)$$

$$F_s=C_{SR}\int[B_n(Q_R^b)-B_n(Q_R^t)]dS_Q+C_{SL}\int[B_n(Q_L^b)-B_n(Q_L^t)]dS_Q= \\ C_{SR}(\Psi_R^b-\Psi_R^t)+C_{SL}(\Psi_L^b-\Psi_L^t)=C_S[(\Psi_R^b+\Psi_L^b)-(\Psi_R^t+\Psi_L^t)], \qquad (7)$$

where $$C_d=0.5[B_n(Q_R)+B_n(Q_L)] \cos(j,n_Q^0)/\mu_0,$$

$$C_{SR}=0.5[B_n(Q_R^b)+B_n(Q_R^t)] \cos(k,n_Q^0)/\mu_0,$$

$$C_{SL}=0.5[B_n(Q_L^b)+B_n(Q_L^t)] \cos(k,n_Q^0)/\mu_0, \ (Q,Q_R^b,Q_R^t,Q_L^b,Q_L^t \in S),$$

In the vicinity of $\delta$ (the magnets' equilibrium) the factors $C_{SR} \approx C_{SL}$, consequently, $C_S \approx 0.5(C_{SR}+C_{SL})$. In the above expressions $\Psi_{WR}$ and $\Psi_{WL}$ are the working fluxes penetrating into the cores 7a, 7b through the surfaces of the right side (R) and left side (L) tips 13. $\Psi_R^b, \Psi_R^t, \Psi_L^b, \Psi_L^t$ are the parts of the same working fluxes ($\Psi_{WR}$ and $\Psi_{WL}$), penetrating through bottom (b) and top (t) parts of the tip surfaces.

One can see from formula (6) and (7) that force $F_d$ is proportional to the difference between the working fluxes multiplied by half the sum of the magnetic flux densities $B_n(Q_R)$ and $B_n(Q_L)$ in some point Q belonging to the tip surface. This difference appears with the deviation $\Delta y$ of the magnets because of the disbalance between the reluctances of the right and left hand parts of the air gaps. In the right hand part of (7) we can see two sums of the parts of the same working fluxes:

$$\Psi^b=\Psi_{WR}^b+\Psi_{WL}^b \text{ and } \Psi^t=\Psi_{WR}^t+\Psi_{WL}^t$$

penetrating into the tips from the bottom and top respectively. The force $F_s$ in (7) is proportional to the difference between these sums caused by the vertical deviation $\Delta z$ following the redistribution of the conductances of upper and lower parts of the air gaps.

We will notice, that the difference of the sums of the working fluxes $(\Psi_R^b+\Psi_L^b)-(\Psi_R^t+\Psi_L^t)$ included in formula (7) does not change in value with the horizontal deviation $\Delta y$ of the magnets towards one of the cores, just as the difference of the working fluxes ($\Psi_{WR}-\Psi_{WL}$) in the formula (6) does not change with the vertical deviation $\Delta z$ of the magnets.

Analyzing expressions (6) and (7) and formulas for $C_d$, $C_{sR}$, $C_{sL}$ one can come to conclusion that sharpening the edges of the core tips at some angle $\beta$, as best shown in FIGS. 2A and 2C, it is possible to obtain the bigger ratio of forces $F_s/F_d$ and their stiffness, than for core tips of rectangular shape. The optimum angle is close to 90°.

Summarizing and simplifying the above discussion, and referring to FIG. 2C, it is clear that the difference between the magnetic fluxes penetrating into the core 7a, 7b through the surface of the tips 13 causes the destabilizing force $F_d$ to arise, while the difference between sums of the parts of the same fluxes penetrating into the core 7a, 7b through the bottom and through the top halves of the surfaces of the tips 13, cause the stabilizing force $F_s$ to arise, and the stabilizing force is proportional to the difference between the fluxes penetrating through the bottom and through the top halves of the surfaces of the tips 13. Accordingly, since the magnetic flux penetrates into the tip 13 in the direction normal to the surface of the tip 13, by sharpening the front surface of the tips 13, it is possible to decrease the horizontal components and to increase the vertical component of the magnetic flux penetrating through the surface of the tips 13, thereby diminishing the destabilizing forces and increasing the stabilizing forces in the units as the result of the deviation from the equilibrium.

Again referring to FIG. 2C, when displacing the magnet 34 downwards, the magnetic flux penetrating through the bottom surface of the tip 13 increases, while the magnetic flux penetrating through the top surface of the tip 13 decreases, thereby increasing the difference therebetween, and thereby substantially increasing the levitating stabilizing force Fs.

As discussed above, the destabilizing forces are decreased by using nonlinear properties of the steel in the cores 7a,7b. The following discussion explains this feature.

As it is known to those skilled in the art, the assertion in S. Earnshaw's and W. Braunbek's theorems that charged, electrified, or magnetized bodies cannot achieve stable equilibrium in electrostatic or magnetic fields are based on the linear properties of the medium (air or vacuum with $\beta_0$=const, $\epsilon_0$=const), where an attempt is made to suspend a heavy body with the help of electrostatic or magnetic forces. When $\mu=\mu_0$, the magnetic potentials $\phi_m$ and $A_m$ satisfy the Laplace's differential equation followed directly by the conclusion that the local extreme of the electrical and magnetic potentials does not exist in the domain occupied by the field. In the year 1839 S. Earnshaw, and then, 100 years later, W. Braunbek proved the impossibility of local minimum of potential energy in a system of separate electrified, or magnetized particles in electrostatic or magnetic fields. Numerous (but unsuccessful) attempts to create systems of rigidly bounded magnets able to float in a stable fashion in their own magnetic field led researchers to draw incorrect conclusions from the above theorems with regard to the potential energy of the mentioned system. The analysis of the energetic surface peculiarities of the MDLSS system given above completely demonstrates that a local extreme can be created in such systems.

As it was discussed above, in order to create the MDLSS, it is necessary to provide a strict local minimum of potential energy along the trajectory of the vehicle 15 movement. In addition to creating rigid ties between the units which provide the local extreme of potential energy of the system at the point of levitator equilibrium (as discussed above), it can be also attained by utilizing the nonlinear properties of the medium $\mu=\mu(B)$ inside the stator assembly 26 of the units 24,25, for reducing the destabilizing force and thus transforming the extreme into a minimum of potential energy; in this case it is necessary to apply electromagnetic screens 8–11 in the magnetic circuit 36 to lower the dissipation fluxes and retain a considerable portion of the magnetic field in the saturated steel cores 7a, 7b.

Figure 7:
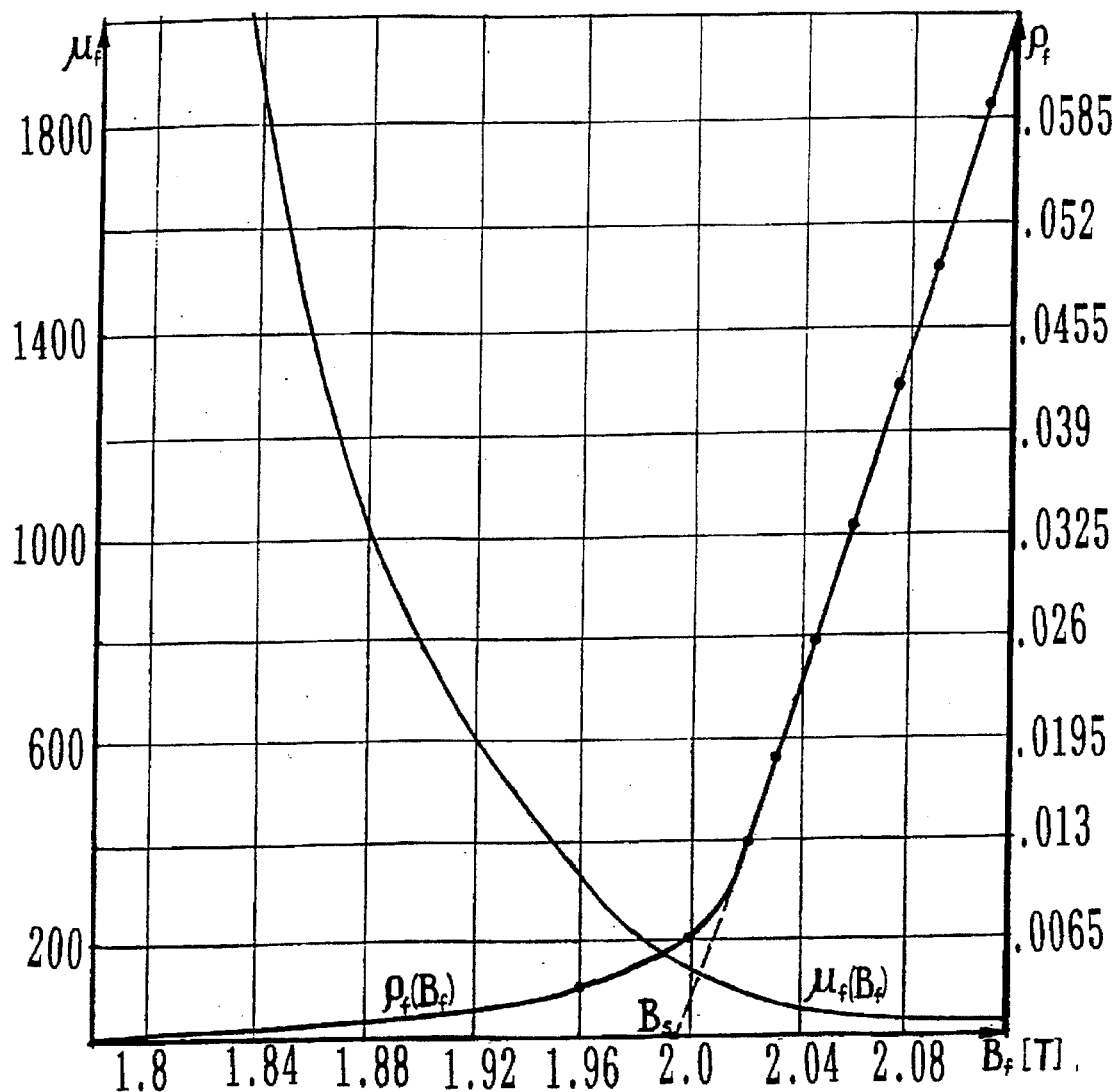
FIG. 7 shows graphs of relative magnetic permeability of electrical steel and its specific magnetic reluctance as functions of magnetic flux density of the steel.

The expression for destabilizing force (6) is rather simple. It suggests a way to suppress the destabilizing force $F_d$ and its stiffness $\partial F_d/\partial y$ by employing the nonlinear magnetic characteristic B(H) of the core steel. It is known that the core's magnetic reluctance grows rapidly as the magnetic flux increases. Having the magnetization curve $B_f(H)$, it is easy to reconstruct the function $\rho_f(B_f)$, where $\rho_f$ is the relatively unitary magnetic reluctance of the core steel. As best shown in FIG. 7, illustrating the function $\rho_f(B_f)$ for M-5 grain-oriented electrical steel (with thickness=0.012"), if $B_f \geq 2.02T$, then the curve $\rho_f(B_f)$ contains a linear fragment with a large incline to the Axis $B_f$ described by the following equation:

$$\rho_f(B_f)=(B_f-B_s)/N \qquad (8)$$

where $B_s$=1.996 T, N=1.916.

The fast growth of $\rho_f(B_f)$ and its linear relation of $B_f$ when $B_f \geq 1.01B_s$ are inherent in all magneto-soft steels. As a consequence of this characteristic the magnetic density $B_f$ in the cross section of the saturated steel cores is levelled: $B_f=\Psi_w/t_s$. Therefore, the magnetic reluctance $r_f$ of the saturated core ($B_f>1.01B_s$) with the length $l_s$ and thickness $t_s$ is equal to:

$$\mu_0 R_f(B_f)=r_f(B_f)=\rho_f(B_f)l_s/t_s=l_s(B_f-B_s)/(Nt_s)=b(B_f-B_s) \qquad (9)$$

where $b=l_s/(Nt_s)$ and $R_f$ is an absolute magnetic reluctance of the core 7a, 7b.

Figure 8A:
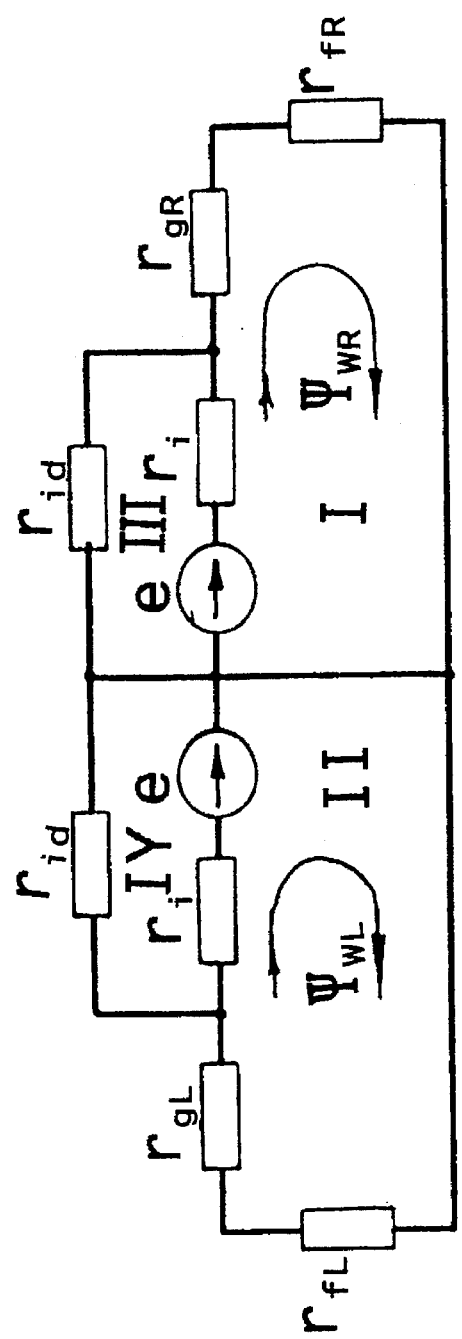
FIG. 8A is the complete equivalent scheme of four loop magnetic circuit of the unit of the present invention.
Figure 8B:
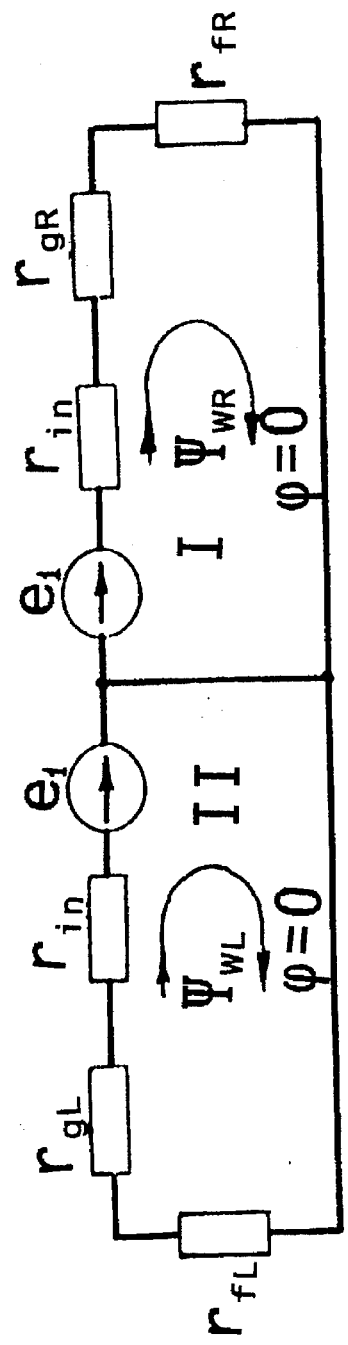
FIG. 8B is the equivalent scheme of two loop magnetic circuit of the unit of the present invention.

To facilitate the understanding, the assembled unit 24,25 including the permanent magnets 32–35 and cores 7, 7a is best shown in FIGS. 8A and 8B, in the form of a closed magnetic circuit containing the following sources of magneto-motive force (mmf):

e=$WH_c\mu_0$ ($H_c$=8.9·10$^5$ A/m) with the internal magnetic reluctance $r_i$=W/(2$\mu_r$h), ($\mu_r$=1.07), four air gaps of total length 4g with magnetic reluctances: $r_{gR}$ (at the right side) and $r_{gL}$ (at the left side), two "C"-shaped steel cores 7,7a with magnetic reluctances: $r_{fR}$ (at the right side) and $r_{fL}$ (at the left side) when the core backs 12 are saturated.

All magnets 32–35 in the unit 24, 25 (with dimensions 2h×W) contain the steel insertion strip 5 between them. This strip 5 serves to connect all the magnets with each other. In addition, it reduces the interactions between the working fluxes in the right-side and left-side cores 7 and 7a. The sources of mmf create the working fluxes in the circuit: $\Psi_{WR}$ and $\Psi_{WL}$, forming a closed contour in the cores, and the dissipation flux $\Psi_{id}$ and $\Psi_{fd}$, forming a closed contour through the environment. $\Psi_{id}$ represents the fluxes closing at the top and bottom of each magnet through the reluctance $r_{id}$. The $\Psi_{fd}$ represents the fluxes which branch out from the working fluxes through the internal and external lateral surfaces 30 and 31 of the backs 12 when they are saturated. The dissipation fluxes reduce the stability of the MDLSS. To suppress or decrease them, the conductive screens 8–11 are utilized.

When the unit 24,25 is in the equilibrium, then the working fluxes are equal to each other and then $F_s$=0 and $F_d$=0. With the small deviation $\Delta y \ll g$ of the magnets, the gaps $g_R$ and $g_L$ between the magnet poles and core tips will change. This leads to changing their magnetic reluctances $r_{gR}$ and $r_{gL}$: the right side gap reluctance will reduce to some value $r_{gR} \approx r_g - \Delta r_g$, but the left side one will increase to some value $r_{gL} \approx r_g + \Delta r_g$, where $\Delta r_g \approx \Delta y/2h$. Then, the equality between the fluxes will be broken, and the resulting difference is the source of the force $F_d$.

Nevertheless, if the magnets are in equilibrium and the unit's cores have been saturated, then an increase in the flux $\Psi_{WR}$ (caused by the reduction of reluctance $r_{gR}$) will engender an increase in the magnetic reluctance $r_{fR}$ of the core by the value $\Delta r_f$, and, vice versa, a decreasing in the flux $\Psi_{WL}$ (caused by the growth of the reluctance $r_{gL}$) will lessen the reluctance $r_{fL}$ by the value $\Delta r_{fL}$. Thus, in the unit with the saturated cores $7a, 7b$, the horizontal deviation of the magnets, $\Delta y$ alters the reluctances of the right side loop: $r_{mR} = (r_g - \Delta r_g) + (r_f + \Delta r_f)$ and the left side loop: $r_{mL} = (r_g + \Delta r_g) + (r_f - \Delta r_f)$ of the circuit by the value: $r_{mL} - r_{mR} = 2(\Delta r_g - \Delta r_f)$ that is less than would cause the same deviation if the core were unsaturated, i.e., $r_{gL} - r_{gR} = 2\Delta r_g > 2(\Delta r_g - \Delta r_f)$.

It follows, that the difference of the working fluxes and the destabilizing force $F_d = C_d(\Psi_{WR} - \Psi_{WL})$ caused by this difference, in the unit can be reduced utilizing core steel saturation.

Mechanical and electromagnetic processes in the MDLSS are interrelated and develop depending on the velocity $V_x$ of the levitator movement and its deviations $\Delta y$ and $\Delta z$ from the assigned trajectory. When the vehicle 15 is immovable, its stability is provided by wheels. When accelerating the vehicle to some speed $V_0$, the destabilizing force it reduced, and the vehicle 15 is stable.

In order to use the non-linearity of the stator core steel for lowering the destabilizing force $F_d$, it is necessary to raise the magnetic density of the working fluxes $\Psi_W$ the core backs along all their length $l_s$ up to the value $B_f > B_s$ that makes all cores working at the linear part $\rho(B_f)$ of the magnetization curve (best shown in FIG. 7). To achieve this, it is necessary to suppress the dissipation fluxes $\Psi_{fd}$ emanating from the lateral surfaces of the saturated core backs. The magnetic permeability of the air $\mu_0$ is as much as five orders higher than its electrical permeability ($\mu_0 > 1.4 \cdot 10^5 \epsilon_0$). Therefore, when a core back is saturated, a considerable portion of the magnetic lines of force of the flux $\Psi_w$ (up to 20%) forms a closed contour through the air. Then, the flux density in the core back 12 diminishes, the magnetic reluctance drops and no longer compensates the changing of the air gaps reluctances at the side shifts $\Delta y$ of the magnets 32–35.

In order to prevent decreasing the flux density in the core backs 12, the magnets 32–35 are connected with each other in such a manner that their polarity alternates along the trajectory of the movement, parallel to the axis OX, as best shown in FIGS. 1C and 2B. Moreover, the core backs 12 are covered with the conductive screens 8–11 made of copper and aluminum with the thickness about 0.02 m. During the vehicle movement with the speed V=150 m/s along the trajectory, the magnetic fluxes in the cores $7a$, $7b$ are alternating in value and direction. If, as shown in FIG. 2B, the length of each magnet $l_x$ is equal to 1.45M and space $d_x$ between the adjacent magnets—0.05M, then the wave length $\lambda$ of the traveling magnetic field in the air gap is equal to: $\lambda = 2(l_x + d_x) = 3.0M$ and the frequency f of oscillation of the magnetic flux in the cores $7a$, $7b$ is $f = V/\lambda = 50$ Hz. The alternative magnetic dissipation fluxes $\Psi_{fd}$ penetrating into the above screens 8–11 induce eddy currents in them that, in its turn, create a counter magnetic field tending to suppress fluctuations of the dissipation fluxes. For example, the two-layer screens with the thickness 2 cm shown in FIG. 2A reduce the value of normal flux density $B_{nfd}$ on the core back surfaces 30 and 31 as much as by 50 times, thus, almost totally isolating the cores $7a$, $7b$ from the environment. When lowering the speed of the vehicle 15 down to V=50 m/s, $\Psi_{fd}$ will reduce approximately by 30 times.

To find the working flux values and values of forces $F_s$ and $F_d$, we have to calculate the unit's magnetic circuit, shown in FIGS. 8A and 8B. Taking into account that each unit is symmetrical with respect to horizontal plane z=const, where the magnetic potential turns into zero, the equivalent scheme can be simplified by eliminating its lower portion. The complete equivalent scheme of the upper part (containing four loops) is shown on FIG. 8A. By substituting the loops III and IY with equivalent generators with the parameters:

$$e_1 = e/(1+r/r_{id}) \quad r_{in} = r/(1+r/r_{id}) \tag{10}$$

we simply reduce it to the two-loop equivalent scheme shown in FIG. 8B. The thickness of the iron insertion strip 5 ($t_d$) is determined in such a way as to prevent saturation, regardless of the shift of the magnets $\Delta y < g$. Its magnetic reluctance $r_d = 0$ at any mode of the unit operation, the loops of the equivalent scheme will split, and we can calculate each loop separately, following Ohm's Law. The calculation is carried out under the assumption that the levitator travels with some speed ($V_0$ or more) with the conductive screen completely suppressing fluxes $\Psi_{fd}$, that is, we assume $r_{fd} \approx \infty$.

The working fluxes in the cores are determined as:

$$\Psi_{WR} = e_1/[(r - \Delta r_g) + r_{fR}(B_f)]; \quad \Psi_{WL} = e_1/[(r + \Delta r_g) + r_{fL}(B_f)] \tag{11}$$

where $r = r_{in} + r_g$

If the cores are unsaturated then $r_{fR} = r_{fL} = 0$, and the internal working fluxes are:

$$\Psi_{WR}^0 = e_1/(r - \Delta r_g); \quad \Psi_{WL}^0 = e_1/(r + \Delta r_g) \tag{12}$$

At the equilibrium of magnets (when $\Delta r_g = 0$):

$$\Psi_{WR} = \Psi_{WL} = \Psi_W = e_1/(r + r_f(B_f)); \quad \Psi_{WR}^0 = \Psi_{WL}^0 = \Psi_W^0 = e_1/r \tag{13}$$

To exploit effectively core steel saturation to raise levitator stability it is necessary to insure the following proportionalities between the dimensions of magnets and cores (W, h, $l_s$, $t_s$, g) and also to choose steels with appropriate characteristics (N, $B_s$) whereby:

1. the magnetic flux density $B_f$ in the core backs would change within the linear part of the curve $\rho_f(B_f)$ (FIG. 7) at the deviation $\Delta y_m < g$.
2. the saturation of the core backs would not lower the magnetic flux density $B_n$ in the core tips and the working fluxes in the cores more than by $\Psi_w^0/\Psi_w = \epsilon$ times ($\epsilon \leq 1.15$), that is equivalent to the restriction from the $B_f$ top.

The conditions 1 and 2 are satisfied if at the given $\epsilon$ and core back length $l_s$ its thickness $t_s$ satisfies the formula:

$$t_s = e_1/\{r[B_s \epsilon + e_1 N(\epsilon - 1)/(B_s l_s)]\} \tag{14}$$

Substituting the expression (9) into (11) we obtain the square equations with respect to the working fluxes $\Psi_{WR}$ and $\Psi_{WL}$ that run in the cores. Solving the equations we find:

$$\Psi_{WR,L} = 0.5 t_s [B_s - (r \pm \Delta r_g) N t_s/l_s]\{1 + \sqrt{[1 + 4e_1 N/(t_s [B_s - (r \pm \Delta r_g) N t_s/l_s]^2)]}\} \tag{15}$$

The saturation of the backs changes the tip' potentials and reduces the value of the density $B_n$. In this case, the factors $C_s$ and $C_d$ (6,7) and also the working fluxes (15) decrease by $\epsilon$ times. At the same time, the core back saturation reduces the difference between the working fluxes by $\zeta$ times, where $$\zeta = \Delta\Psi_w^0/\Delta\Psi_w = (\Psi_{WR}^0 - \Psi_{WL}^0)/(\Psi_{WR} - \Psi_{WL}) \tag{16}$$

For the unit shown in FIG. 2A $\zeta=10.3 \approx 9\epsilon$ with the given value of $\epsilon=1.15$.

We will give now an example of calculation of the magnetic circuit of the unit.

Figure 9:
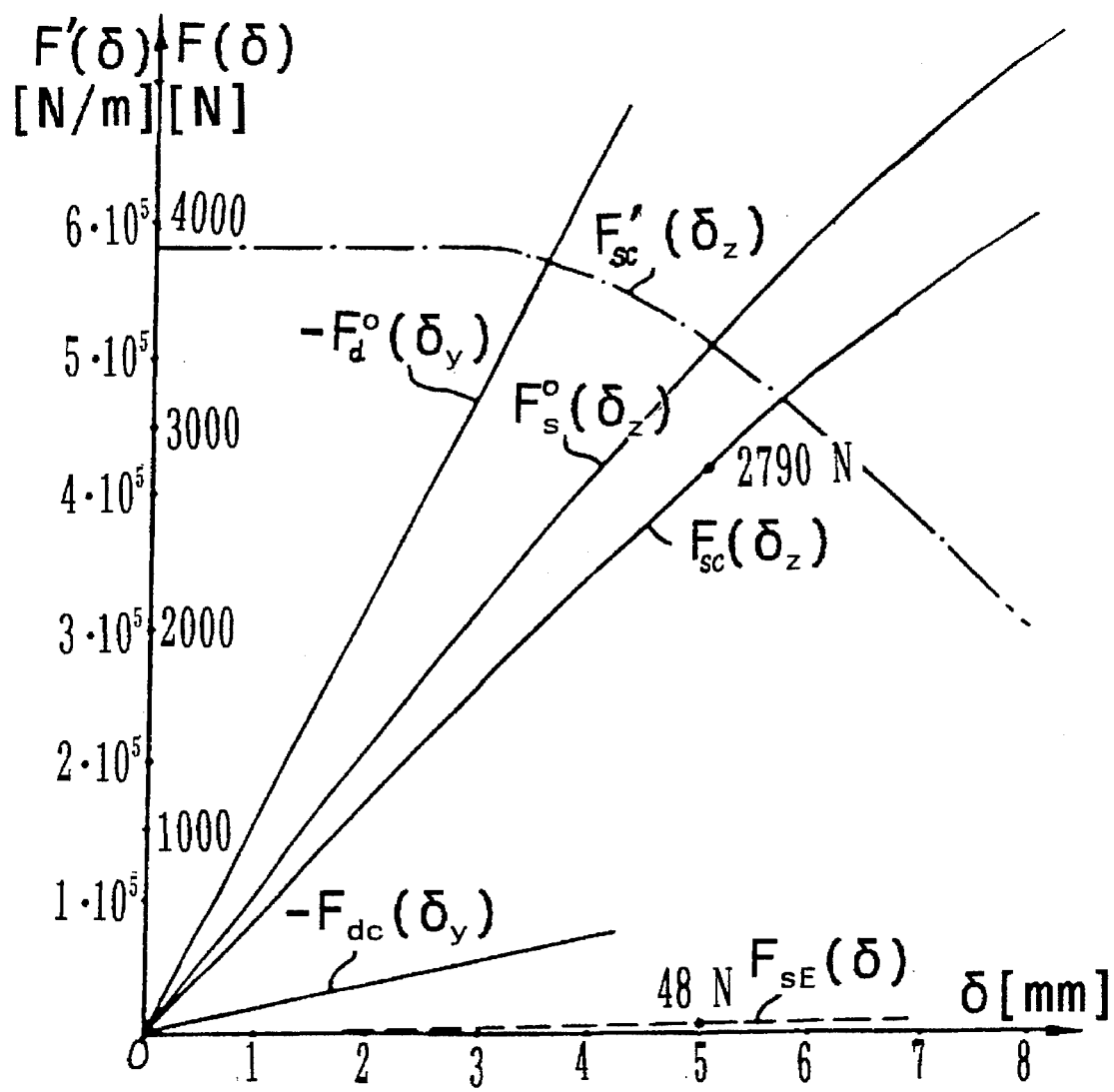
FIG. 9 shows graphs of the stabilizing and destabilizing forces as functions of the assembled magnets' shifts in the real model.

The initial data:

W=0.03 m, 2h=0.025 m, g=0.005 m, $l_s$=0.06 m, $H_c$=8.9·10$^5$ A/m, $B_s$=1.996T, N=1.916, $\mu_r$=1.07, $r_g$=0.3, $\Delta r_g$=0.05, $\epsilon$=1.1, V=150 m/s Calculated values of the equivalent scheme parameters:

$r_f$=1.12, $r_{id}$=1.53, $r_{in}$=0.647, $r_{gR}$=0.25, $r_{gL}$=0.35
$e = \mu_0 W H_c = 3.355 \cdot 10^{-2}$, $e_1 = 1.936 \cdot 10^{-2}$, $t_s = 9.1823 \cdot 10^{-3}$, $\Delta y = 2.5$ mm,
$\Psi_{WR} = 1.87 \cdot 10^{-2}$ Wb, $\Psi_{WL} = 1.8466 \cdot 10^{-2}$ Wb, $\Delta\Psi_w^0 = 1.0821 \cdot 10^{-3}$ Wb,
$\Delta\Psi_w = 1.16966 \cdot 10^{-4}$ Wb, $\zeta = 9.25$, $B_{fR} = 2.03652$T, $B_{fL} = 2.011044$T To evaluate the forces acting in the MDLSS we used the results of measuring the forces in the real model of the unit with unsaturated cores (with the length $l_x$=0.06 m). These results are represented in FIG. 9, where stabilizing and destabilizing forces are shown as functions of shifts: $F_s^0(\delta_z)$ and $F_d^0(\delta_y)$. The same forces $F_{sc}(\delta_z) = F_{sc}^0(\delta_z)/\epsilon^2$ and $F_{dc}(\delta_y) = F_d^0(\delta_y)/\epsilon\zeta$ and stiffness of the stabilizing force $F'_{sc}(\delta_z) = \partial F_{sc}(\delta_z)/\partial z$ were recalculated considering saturation of the core backs and also shown there. The ordinates of all the graphs are scaled with respect to the length of the magnets $l_x$=1 m. Consequently, if the length of the magnets equals to the length of a vehicle $L_v$=20M and the MDLSS comprises four supporting and two stabilizing units (rigidly connected with the levitator after the vehicle having settled down by the shift $\Delta z$=5 mm) then the vehicle with its weight $F_v$=22 tons (that is 220,000N) floats stably. In this case, a lateral force $F_{lat}$=5 tons could move the vehicle aside no more than by $\Delta y$=2.3 mm.

Approximate calculations have shown that protruding arms 8$a$ and 9$a$ (FIG. 2A) of the aluminum screens suppress dissipation fluxes and thus increase the working core fluxes and the stabilizing force.

To calculate the magnetic circuit of the unit with sufficient accuracy it is necessary to determine values of reluctance to the dissipation fluxes $\Psi_{id}$ and $\Psi_{fd}$. The reluctances can be expressed in terms of potentials and fluxes:

$$r_{id} = \phi_p/\Psi_{id} \quad r_{fd} = \Delta\phi/\Psi_{fd}$$

where $\phi_p$ is the magnetic potential on the magnet pole;

$\Delta\phi_p$ is the magnetic potential drop along the length $l_s$ of the saturated core back.

In as much as all components of the unit are cylindrical in shape, the unit's magnetic field is plane-parallel. This allows to find analytical solution for the fluxes and reluctances $r_{id}$ and $r_{fd}$ applying the Poisson's Integral for the upper semi-plane. For above example, in the unit shown in FIG. 2A $r_{id}$=1.53. With the shift $\Delta y$=2.5 mm of the magnets the values of the magnetic flux density in the core backs are: $B_{fR}$=2.03652T, $B_{fL}$=2.011044T. Then, the dissipation fluxes are:

$\Psi_{fdR} = 2.375 \cdot 10^{-3}$ Wb=12.7% $\Psi_{WR}$, $\Psi_{fdL} = 0.8707 \cdot 10^{-3}$ Wb=4.7% $\Psi_{WL}$ The calculation of the conductive screens was also made analytically. We obtained an exact solution of the problem of flat sinusoidal electromagnetic wave propagation in the three-layer conducting medium. Then, the real electromagnetic wave (created by the moving magnets of the levitator) was expanded into Forier series where its first eleven harmonics were considered. Further, the analytical expressions for the distribution of potentials and electromagnetic field intensities close to the lateral surface of the stator in front and behind the conducting screens were obtained. Thus, knowing the field distribution, it was possible to calculate certain essential magnitudes:

$k_{sup}$—the coefficient for suppressing dissipation fluxes (coming from the cores) by eddy currents induced in the screen:

$$k_{sup} = B_m(Q_1)/B_{mscr}(Q_1),$$

where $B_m(Q_1)$ is an amplitude of the magnetic flux density in the point $Q_1$, belonged to the core back surface with no conductive screen, $B_{mscr}(Q_1)$ is an amplitude of the magnetic flux density in the same point in the presence of the ic] conductive screen;

$k_{scr}$—the coefficient for screening the flux (behind the screen):

$$k_{scr} = B_m(Q_2)/B_{mscr}(Q_2),$$

where $B_m(Q_2)$ is an amplitude of the magnetic flux density in the point $Q_2$, disposed behind the screen surface in its absence, $B_{mscr}(Q_2)$ is an amplitude of the magnetic flux density in the same point in the presence of the screen.

For aluminum screen with the thickness 0.02 m at the levitator's speed V=180 m/s and $\lambda$=3 m $k_{sup}$=46,2 and $k_{scr}$=162.0;

p—the total losses of energy in the screens of the vehicle. With the shift $\Delta y$=2.5 mm of the magnets p=54·10$^3$ W;

$F_x$—the force impeding levitator magnets movement appearing due to losses of energy in the screen. $F_x$=300N for the whole vehicle;

$F_y$—the force repelling the moving magnet from the flat screen. To compare the forces in Electrodynamic Suspension system and proposed Magnetodynamic Suspension systems, the graph of the stabilizing force as function of shift $\delta$: $F_{sE}(\delta) = F_y(g-\delta) - F_y(g+\delta)$ (with g=0.05 m) for EDS is also shown in FIG. 9 by dotted line.

Accordingly, it will be appreciated by those skilled in the art that within the scope of the appended claims, the invention may be practiced other that has been specifically described herein, as long as the following unique features of the present invention are employed which reduce the destabilizing forces and increase stabilizing forces created in the MDLSS:

1. stabilizing and supporting units with reciprocally perpendicular vectors of magnetization;
2. rigid ties between the magnet assemblies in the MDLSS;
3. non-linear characteristics of the steel in the cores, saturated back and unsaturated tips;
4. conductive screens covering lateral surfaces of the back of each core and suppressing the dissipation magnetic fluxes;
5. sharpened ends of the tips;
6. the width of the tips larger than the width of the back in each core.

What I claim is:

1. A Magneto-Dynamic Levitation and Stabilizing Self-Regulating System (MDLSS), comprising at least one unit, said unit comprising:

a stator assembly and a levitator assembly magnetically coupled to the stator assembly and movable with respect thereto;

wherein said stator assembly includes a pair of substantially identical elongated laminated steel cores, each including a back and a pair of substantially identical tips, the back having external and internal lateral surfaces, wherein each of said tips is wider than the back and has a sharpened end thereon, wherein said cores are positioned with the tips of one of said cores towards the tips of another one of said cores, such that an air gap exists therebetween, and wherein said stator assembly further includes non-magnetic conductive screens covering said external and internal lateral surfaces of the back of each core;

wherein said levitator assembly includes four permanent magnets connected by rigid ties and positioned in two levels with two permanent magnets of the same polarity in each level, respective permanent magnets in said two levels positioned one under another being of opposite polarity, the permanent magnets having substantially identical rectangular cross-section with a middle point thereof, wherein a distance between the sharpened ends of the tips of each core is substantially equal to a distance between middle points of the permanent magnets positioned in each of said two levels, and wherein said permanent magnets are disposed in the air gap existing between the tips of the cores of the stator assembly;

wherein said levitator assembly has an equilibrium position in which the permanent magnets in each of said two levels are situated centrally in the air gap between respective tips of the opposite cores and with the middle points of the permanent magnets in precise registration with the sharpened end of a respective one of said tips of the cores of the stator assembly;

wherein said permanent magnets of the levitator assembly generate an original magnetic field and magnetize the steel cores of the stator assembly which in turn create a secondary magnetic field; and wherein, once said levitator assembly has been displaced from the equilibrium position, the original and the secondary magnetic fields create a stabilizing force returning the levitator assembly to the equilibrium position.

2. The Magneto-Dynamic Levitation and Stabilizing Self-Regulating System of claim 1, further comprising a common foundation having a bottom and a pair of spaced apart side walls, wherein a body moves along a trajectory pre-determined in said common foundation, said body having a bottom and a pair of side walls, first and second pairs of identical said units magnetically coupling the body and the common foundation, said first pair of substantially identical said units being installed symmetrically between the bottoms of the body and the common foundation, each unit of said second pair of substantially identical said units being installed between respective side walls of the body and the common foundation in precise registration therebetween, the stator assemblies of said units being installed on the common foundation, and the levitator assemblies of said units being installed on the body; and wherein said stabilizing forces created in each of the units once the equilibrium position has been violated provide stable hovering and flight of the body along the pre-determined trajectory.

3. The Magneto-Dynamic Levitation and Stabilizing Self-Regulating System of claim 2, wherein said stator assembly extends substantially the length of the pre-determined trajectory, wherein a distance between the respective tips of the opposite steel cores of the stator assembly is invariable along the length of the pre-determined trajectory, wherein said levitator assembly extends substantially the length of the body and includes a plurality of substantially identical levitator sub-assemblies, each comprising said four permanent magnets connected by rigid ties and positioned in two levels with two permanent magnets of the same polarity in each level, adjacent permanent magnets in each two adjacent levitator sub-assemblies being of opposite polarity and having a certain period of alteration of the permanent magnets' polarity along the length of the body, and wherein, during the motion of the body along the pre-determined trajectory, the permanent magnets of the levitator assembly produce magnetic fluxes in the steel cores of the stator assembly, said magnetic fluxes alternating periodically with a frequency proportionate to speed of the body and inversely proportionate to the period of alteration of the permanent magnets' polarity along the length of the body.

4. The Magneto-dynamic Levitation and Stabilizing Self-Regulating System of claim 3, further including an iron insertion strip connecting the permanent magnets positioned in two different said levels and positioned between two permanent magnets in the same one of said two levels of the levitator assembly, thereby constituting a magnet assembly, said insertion strip being secured by one end thereof to the body, wherein the permanent magnets in each of said two levels of said magnet assembly are magnetized parallel to a straight line connecting the sharpened ends of the respective said tips of the opposite cores;

wherein an orientation of magnetization in one of said two levels is opposite to an orientation of magnetization in another one of said two levels;

wherein a displacement of the magnet assembly in the direction parallel to the orientation of magnetization in any of said two levels towards one of said two steel cores, engenders an internal destabilizing force which tends to further attract the magnet assembly to said one of the two steel cores;

wherein a displacement of the magnet assembly in the direction perpendicular to the direction of magnetization and the pre-determined trajectory engender an internal stabilizing force tending to reduce the displacement and to bring the magnet assembly back to the equilibrium position;

wherein a turn of the magnet assembly around an axis parallel to the direction of magnetization engenders an internal stabilizing torque which tends to return the magnet assembly to the equilibrium position; and wherein directions of said stabilizing and destabilizing forces are reciprocally perpendicular.

5. The Magneto-Dynamic Levitation and Stabilizing Self-Regulating System of claim 4, wherein the magnet assembly and a pair of said steel cores of the stator assembly constitute a double-loop magnetic circuit comprising a pair of loops;

wherein each of said pair of the loops includes said iron insertion strip, which is common for both of said pair of loops, two permanent magnets located at the different of said two levels, at one side from the iron insertion strip, one steel core, and two air gaps between the permanent magnets and respective tips of the steel cores;

wherein the iron insertion strip is in a unsaturated state;

wherein zero magnetic reluctance of the unsaturated iron insertion strip creates magnetic fluxes in the steel cores of the stator assembly, said magnetic fluxes created in each of said pair of the loops being independent;

wherein a displacement of the magnet assembly towards one of said steel cores affects parameters of said magnetic circuit, such that in one of said pair of the loops both air gaps decrease, thereby reducing their magnetic reluctance and increasing magnetic flux in the respective steel core; and such that in another one of said pair of the loops both air gaps increase, thereby increasing their magnetic reluctance and reducing magnetic flux in the respective steel core.

6. The Magneto-Dynamic Levitation and Stabilizing Self-Regulating System of claim 5, wherein the destabilizing force is proportionate to the difference of two magnetic fluxes, one of which runs through a full surface of the tip of one of said steel cores, and another of which runs through a full surface of respective tip of the opposite steel core; and wherein said stabilizing force is proportionate to the difference of two sums, one of which comprises magnetic fluxes running through bottom halves of the surfaces of the tips on both opposite steel cores, and another sum comprises the magnetic fluxes running through upper halves of the same tips.

7. The Magneto-Dynamic Levitation and Stabilizing Self-Regulating System of claim 1, wherein a length and a width of the tips of the steel cores are chosen so as to avoid saturation of the tips at any displacement of the magnet assembly, and to cause the density of said magnetic flux penetrating into the tip of the steel core to decline at least twenty (20) times when displaced away from the sharpened end of tip towards the back of the steel core, said ends of the tips of the steel core being sharpened at an acute angle.

8. The Magneto-Dynamic Levitation and Stabilizing Self-Regulating System of claim 1, wherein the internal and external lateral surfaces of the back of the steel core are covered by non-magnetic conductive metallic screens both inside and outside of said unit;

said screens suppressing magnetic dissipation fluxes generated in the steel cores, thereby maintaining the steel core saturation along the length of the back of the steel core during the body movement, and thereby lowering the destabilizing force.

9. The Magneto-Dynamic Levitation and Stabilizing Self-Regulating System of claim 4, wherein the air gaps between the permanent magnets and the sharpened ends of the respective tips are chosen of such a size as to maintain the back of the steel core saturated during the movement along the pre-determined trajectory;

wherein a length and a width of the back of the steel core are chosen in such a manner that when the levitator assembly is displaced towards a respective steel core by a half of said air gap distance, the back of the opposite steel core remains saturated; and wherein a thickness of said iron insertion strip is chosen in such a manner that when the magnet assembly is displaced towards any steel core by a half of said air gap distance, the insertion strip remains unsaturated.

10. The Magneto-Dynamic Levitation and Stabilizing Self-Regulating System of claim 1, wherein a pair of said identical units connected by rigid non-magnetic ties constitute a sub-system;

wherein the elongated steel cores of the stator assembly in each of the units have respective cylindrical generatrices;

wherein said identical units in each said sub-system are connected in such a manner that directions of magnetization of the permanent magnets in each of the units therein are reciprocally perpendicular and the cylindrical generatrices of the elongated steel cores in the both units are parallel to each other;

wherein, once the levitator assembly in each of the sub-system has been displaced from the equilibrium position, a destabilizing force is created; and wherein the destabilizing force of one unit is compensated by the stabilizing force of another unit.

11. The Magneto-Dynamic Levitation and Stabilizing Self-Regulating System of claim 10, wherein a vehicle moves along a pre-determined trajectory, wherein a pair of said identical sub-systems are joined into a system by rigid non-magnetic ties across said vehicle; and wherein all destabilizing forces and destabilizing torques created in one of said sub-systems are compensated by the stabilizing forces and stabilizing torques created in another one of said sub-systems.

12. The Magneto-Dynamic Levitation and Stabilizing Self-Regulating System (MDLSS), comprising:

a guide-way assembly, including:

a common concrete foundation;

a plurality of cylindrical laminated steel cores positioned in pairs symmetrically with respect to each other and extended along the length of the guide-way, each steel core having a C-shaped cross-section with a back and a pair of sharpened tips extended towards an opposite one in the pair of the steel cores; and a plurality of non-magnetic metallic screens covering external and internal lateral surfaces of said backs of the laminated steel cores substantially the length thereof;

wherein the steel cores are secured on said common concrete foundation by rigid non-magnetic ties, with an air gap between corresponding opposite tips of the steel cores in each pair thereof being invariable along the guide-way—stator length; and a vehicle-levitator assembly, including:

a plurality of identical iron insertion strips extending along the vehicle;

a plurality of magnet assemblies disposed along the length of the vehicle and connected together by rigid non-magnetic ties; wherein each magnet assembly is disposed symmetrically in said air gap between opposite steel cores in each said pair of the steel cores.

13. A method for magnet-dynamic levitation of a body moving along a trajectory, the method comprising the steps of:

providing a common foundation having a bottom and a pair of spaced apart side walls, and determining said trajectory in said common foundation;

providing a body having a bottom and a pair of spaced apart side walls;

providing at least four substantially identical units, each including stator and levitator assemblies magnetically coupled together;

wherein said stator assembly includes:
- a pair of substantially identical elongated laminated steel cores, each steel core having a back and a pair of substantially identical tips, the back having internal and external lateral surfaces, wherein each of said tips is wider than the back and has a sharpened end thereon extended towards the sharpened ends of the tips of the opposite steel core in said pair of the steel cores, and
- non-magnetic conductive screens covering said internal and external lateral surfaces of the back of said steel cores;

wherein said levitator assembly includes:
- four permanent magnets rigidly tied and arranged in two levels with two permanent magnets of the same polarity in each of said two levels and with permanent magnet of opposite polarity positioned one under another in the different of said two levels, said permanent magnets being positioned symmetrically within an air gap existing between the sharpened ends of the tips of the steel cores of the stator assembly;
- installing a first pair of said four units symmetrically between the bottoms of the body and the common foundation, and installing a second pair of said four units symmetrically between side walls of the body and the common foundation in precise registration with each other,
- such that said stator assemblies of the units are installed on the common foundation and are rigidly tied to each other, and such that said levitator assemblies of the units are installed on the body and are rigidly tied to each other; and driving the body along the pre-determined trajectory.

14. The method of claim 13, wherein the units in the first pair thereof counterbalance weight of the body and support the body at a certain level above the bottom of the common foundation, and wherein the units in the second pair thereof counterbalance both centrifugal forces arising during turns of the body and any external lateral forces applied to the body.

15. The method of claim 13, wherein the permanent magnets of the levitator assembly, said pair of the steel cores of the stator assembly and air gaps between each permanent magnets and a respective tip constitute a double-loop magnetic circuit, comprising a left loop and a right loop, having respective magnetic fluxes, wherein each of said air gaps has a magnetic reluctance;

wherein a displacement of the permanent magnets towards the steel core in the right loop decreases magnetic reluctance of the air gaps in the right loop and increases the magnetic reluctance of the air gaps in the left loop, that causes increase of the magnetic flux in the right loop and decrease of the magnetic flux in the left loop, thereby increasing saturation of the back of the right core and increasing the magnetic reluctance thereof, and thereby decreasing saturation of the back of the left core and decreasing the magnetic reluctance thereof;

wherein a displacement of the permanent magnets towards the steel core in the left loop causes inversely symmetrical processes with respect to the processes created at the displacement of the permanent magnets towards the steel core in the right loop;

wherein, at a side displacement of the permanent magnets, an increment of the magnetic reluctance of the air gaps is compensated by the inverse increment of the magnetic reluctance of the saturated steel in the back of the respective core, such that a resulting magnetic reluctance in each of said loops remains approximately equal to each other; and wherein, at said side displacement of the permanent magnets, the difference between the magnetic fluxes in the right and left cores is approximately zero.

* * * * *